United States Patent
Zeng et al.

(10) Patent No.: US 12,260,854 B2
(45) Date of Patent: Mar. 25, 2025

(54) RESPONSE METHOD IN HUMAN-COMPUTER DIALOGUE, DIALOGUE SYSTEM, AND STORAGE MEDIUM

(71) Applicant: HUAWEI TECHNOLOGIES CO., LTD., Guangdong (CN)

(72) Inventors: Yulong Zeng, Shenzhen (CN); Yasheng Wang, Shenzhen (CN); Yadao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 17/989,756

(22) Filed: Nov. 18, 2022

(65) Prior Publication Data

US 2023/0084583 A1     Mar. 16, 2023

Related U.S. Application Data

(63) Continuation of application No. PCT/CN2021/085021, filed on Apr. 1, 2021.

(30) Foreign Application Priority Data

May 20, 2020  (CN) .......................... 202010431996.7

(51) Int. Cl.
   *G10L 15/22*     (2006.01)
   *G10L 15/06*     (2013.01)
   *G10L 15/18*     (2013.01)

(52) U.S. Cl.
   CPC ........ *G10L 15/1815* (2013.01); *G10L 15/063* (2013.01); *G10L 15/22* (2013.01);
   (Continued)

(58) Field of Classification Search
   CPC .......................... G10L 15/1815; G10L 15/22
   See application file for complete search history.

(56) References Cited

U.S. PATENT DOCUMENTS

| | | | |
|---|---|---|---|
| 2017/0185582 A1* | 6/2017 | Gelfenbeyn | .......... G06F 40/253 |
| 2019/0139538 A1 | 5/2019 | Gelfenbeyn et al. | |
| 2020/0142719 A1* | 5/2020 | Akbulut | .............. G06F 16/3329 |

FOREIGN PATENT DOCUMENTS

| | | |
|---|---|---|
| CN | 110196930 A | 9/2019 |
| CN | 110223692 A | 9/2019 |

(Continued)

OTHER PUBLICATIONS

Marc Aurelio Ranzato et al., Sequence Level Training With Recurrent Neural Networks, arXiv:1511.06732v3 [cs.LG] Dec. 15, 2015, 15 pages.

(Continued)

*Primary Examiner* — Ibrahim Siddo

(57) ABSTRACT

The technology of this application relates to a response method in a human-computer dialogue, a dialogue system, and a storage medium, and belongs to the field of artificial intelligence. In a process of a dialogue between a user and a machine, a user intent of a current dialogue is determined based on an expected user intent associated with a sentence replied by the machine to the user in a previous dialogue, so that a response is made. Because processing logic for an expected user intent is introduced, accuracy of a generated response sentence is improved.

14 Claims, 17 Drawing Sheets

(52) U.S. Cl.
    CPC ............... *G10L 2015/0635* (2013.01); *G10L 2015/0638* (2013.01); *G10L 2015/223* (2013.01)

(56) References Cited

FOREIGN PATENT DOCUMENTS

| | | |
|---|---|---|
| CN | 110874399 A | 3/2020 |
| CN | 111737411 A | 10/2020 |

OTHER PUBLICATIONS

Aaditya Prakash et al., Neural Paraphrase Generation with Stacked Residual LSTM Networks, arXiv:1610.03098v3 [cs. CL] Oct. 13, 2016, 12 pages.
Ziqiang Cao et al., Joint Copying and Restricted Generation for Paraphrase, Proceedings of the Thirty-First AAAI Conference on Artificial Intelligence (AAAI-17), 2017, 7 pages.
Shiqi Zhao et al., Application-Driven Statistical Paraphrase Generation, Proceedings of the 47th Annual Meeting of the ACL and the 4th IJCNLP of the AFNLP, pp. 834-842, Suntec, Singapore, Aug. 2-7, 2009, 9 pages.
European Search Report for EP Application No. 21808970 dated Jul. 11, 2023, 9 pages.
International Search Report for PCT Application No. PCT/CN2021/085021 dated Apr. 1, 2021, 11 pages.

\* cited by examiner

Note: user_def_location indicates a user-defined location; sys_place indicates a location in the system dictionary; sys_people indicates a person in the system dictionary; and sys_time indicates time in the system dictionary Note: context_spots indicates a context intent of asking about a location; NO_REPLY indicates that no specific reply is generated; and global_place indicates a global location slot

RESPONSE METHOD IN HUMAN-COMPUTER DIALOGUE, DIALOGUE SYSTEM, AND STORAGE MEDIUM

CROSS-REFERENCE TO RELATED APPLICATIONS

This application is a continuation of International Application No. PCT/CN2021/085021, filed on Apr. 1, 2021, which claims priority to Chinese Patent Application No. 202010431996.7, filed on May 20, 2020. The disclosures of the aforementioned applications are hereby incorporated by reference in their entireties.

TECHNICAL FIELD

This application relates to the field of artificial intelligence technologies, and in particular, to a response method in a human-computer dialogue, a dialogue system, and a storage medium.

BACKGROUND

In a daily dialogue, coreference and omission are common linguistic phenomena. In a human-computer dialogue, when a user uses coreference and omission, a dialogue system needs to understand a real user intent of the user with reference to a context, to ensure that the human-computer dialogue is more fluent and natural.

Currently, a dialogue system may understand a user intent of a current dialogue by using a user intent associated with a previous dialogue. Specifically, when configuring a user intent A and a reply A corresponding to the user intent A for a dialogue, a developer further configures an expected reply sentence B of a user for an interaction device in a next dialogue, and a user intent B corresponding to the reply sentence B of the user for the interaction device. When the user initiates a dialogue, if a current reply sentence of the user matches the reply sentence B, the current reply sentence of the user matches the user intent B. In this case, the dialogue system determines a response sentence based on the user intent B, and replies to the reply sentence of the user for the interaction device by using the response sentence.

One user intent usually has a variety of expressions. However, when configuring a reply sentence of a user for an interaction device and a corresponding user intent, a developer cannot fully cover expressions of the user. Therefore, when the foregoing method is used, because an expression of a current reply sentence of the user for the interaction device is not preconfigured, a case in which the reply sentence of the user for the interaction device cannot match a user intent associated with a previous dialogue occurs. As a result, coherence of a dialogue is poor, and accuracy of a response sentence generated by the dialogue system is low.

SUMMARY

Embodiments of this application provide a response method in a human-computer dialogue, a dialogue system, and a storage medium, to improve coherence of a human-computer dialogue. Technical solutions are as follows.

According to a first aspect, a response method in a human-computer dialogue is provided. In the method, a reply sentence of a user for an interaction device is obtained; intent recognition is performed on the reply sentence to obtain a candidate user intent; a historical response sentence, of the interaction device, that is in a historical dialogue and that is adjacent to the reply sentence is obtained; a target expected user intent matching the candidate user intent is determined from a plurality of expected user intents associated with the historical response sentence, where the expected user intent is used to indicate a category of an expected reply of the user to the historical response sentence; and a target response of the interaction device to the reply sentence is determined based on the target expected user intent and the historical response sentence.

For example, the expected user intent indicates a positive reply. For example, the expected user intent is "yes". For another example, the expected user intent indicates a negative reply. For another example, the expected user intent indicates like. For another example, the expected user intent indicates dislike.

In the foregoing method, a response sentence initiated by the interaction device is associated with an expected user intent. When the user initiates a dialogue, in a process of selecting a user intent from candidate user intents of the current dialogue, a dialogue system preferentially selects a target expected user intent matching a historical response sentence, and the dialogue system determines a response sentence by using the target expected user intent. Because processing logic for an expected user intent is introduced and an expected user intent of a historical dialogue is passed to the current dialogue for use, the historical dialogue and the current dialogue are associated in terms of the user intent, thereby improving accuracy of a response sentence generated by the dialogue system, helping improve a context cohesion capability of the dialogue system, and improving coherence of a human-computer dialogue.

Optionally, the target response is outputting a response sentence, or the target response is executing a corresponding instruction, for example, playing a song.

Optionally, that a target response of the interaction device to the reply sentence is determined based on the target expected user intent and the historical response sentence includes:

determining a redirect-to user intent based on the historical response sentence and the target expected user intent;

determining, based on the redirect-to user intent, an instruction corresponding to the redirect-to user intent; and executing the instruction corresponding to the redirect-to user intent.

Optionally, that a target expected user intent matching the candidate user intent is determined from a plurality of expected user intents associated with the historical response sentence includes:

determining, from the plurality of expected user intents associated with the historical response sentence, an expected user intent the same as the candidate user intent as the target expected user intent.

According to a second aspect, a response method in a human-computer dialogue is provided. The method includes:

obtaining a reply sentence of a user for an interaction device;

performing intent recognition on the reply sentence to obtain a candidate user intent;

obtaining a historical response sentence, of the interaction device, that is in a historical dialogue and that is adjacent to the reply sentence;

determining, from a plurality of expected user intents associated with the historical response sentence, a target expected user intent matching the candidate user intent, where the expected user intent is used to indicate content of an expected reply of the user to the historical response sentence; and determining a target response sentence of the interaction device for the reply sentence based on the target expected user intent.

For example, the expected user intent is "asking about weather in Beijing". For another example, the expected user intent is "asking about a route in Shenzhen".

Optionally, the determining a target response sentence of the interaction device for the reply sentence based on the target expected user intent includes:

obtaining, based on a correspondence between the historical response sentence and at least one candidate response sentence template, the at least one candidate response sentence template corresponding to the historical response sentence, where the candidate response sentence template is used to indicate a sentence pattern of the target response sentence;

obtaining, from the at least one candidate response sentence template based on a correspondence between the target expected user intent and a target response sentence template, the target response sentence template matching the target expected user intent; and determining, based on the target response sentence template and the historical response sentence, the target response sentence of the interaction device for the reply sentence.

Optionally, the determining, based on the target response sentence template and the historical response sentence, the target response sentence of the interaction device for the reply sentence includes:

obtaining a target keyword, where the target keyword is used to indicate key session content of the historical dialogue;

recognizing a type of the target keyword; and filling the target keyword to a first target slot corresponding to the type in the target response sentence template, to obtain the target response sentence.

Optionally, the obtaining a target keyword includes:

extracting the target keyword from the historical response sentence; or extracting the target keyword from a historical reply sentence, in the historical dialogue, of the user for the interaction device; or querying configuration information to obtain the target keyword associated with the historical response sentence, where the configuration information includes a preset association relationship between the historical response sentence and the target keyword.

Optionally, the extracting the target keyword from the historical response sentence includes: performing named entity recognition on the historical response sentence, and using an obtained common named entity as the target keyword.

Optionally, the extracting the target keyword from a historical reply sentence, in the historical dialogue, of the user for the interaction device includes: performing named entity recognition on the historical reply sentence, and using an obtained common named entity as the target keyword.

Optionally, after the performing intent recognition on the reply sentence to obtain a candidate user intent, the method further includes:

when it is recognized that information required for determining the target response sentence is missing in the candidate user intent, performing the step of determining a target response sentence of the interaction device for the reply sentence based on the target expected user intent.

Optionally, the determining, from a plurality of expected user intents associated with the historical response sentence, a target expected user intent matching the candidate user intent includes:

determining, from the plurality of expected user intents associated with the historical response sentence, an expected user intent including the candidate user intent as the target expected user intent.

According to a third aspect, a dialogue system is provided. The dialogue system includes:

an obtaining module, configured to obtain a reply sentence of a user for an interaction device;

a recognition module, configured to perform intent recognition on the reply sentence to obtain a candidate user intent, where the obtaining module is further configured to obtain a historical response sentence, of the interaction device, that is in a historical dialogue and that is adjacent to the reply sentence; and a determining module, configured to determine, from a plurality of expected user intents associated with the historical response sentence, a target expected user intent matching the candidate user intent, where the expected user intent is used to indicate a category of an expected reply of the user to the historical response sentence, where the determining module is further configured to determine a target response of the interaction device to the reply sentence based on the target expected user intent and the historical response sentence.

Optionally, the determining module is configured to determine a redirect-to user intent based on the historical response sentence and the target expected user intent, and determine, based on the redirect-to user intent, an instruction corresponding to the redirect-to user intent; and the dialogue system further includes an execution module, configured to execute the instruction corresponding to the redirect-to user intent.

Optionally, the determining module is configured to determine, from the plurality of expected user intents associated with the historical response sentence, an expected user intent the same as the candidate user intent as the target expected user intent.

Optionally, the dialogue system is a terminal. For example, the dialogue system is a mobile phone, a smart speaker, or a chatbot.

Optionally, the dialogue system is a cloud device. For example, the dialogue system is a server.

According to a fourth aspect, a dialogue system is provided. The dialogue system includes:

an obtaining module, configured to obtain a reply sentence of a user for an interaction device;

a recognition module, configured to perform intent recognition on the reply sentence to obtain a candidate user intent, where the obtaining module is further configured to obtain a historical response sentence, of the interaction device, that is in a historical dialogue and that is adjacent to the reply sentence; and a determining module, configured to determine, from a plurality of expected user intents associated with the historical response sentence, a target expected user intent matching the candidate user intent, where the expected user intent is used to indicate content of an expected reply of the user to the historical response sentence, where the determining module is further configured to determine a target response sentence of the interaction device for the reply sentence based on the target expected user intent.

Optionally, the determining module is configured to: obtain, from at least one candidate response sentence template based on a correspondence between the target expected user intent and the candidate response sentence template, the target response sentence template matching the target expected user intent; and determine, based on the target response sentence template and the historical response sentence, the target response sentence of the interaction device for the reply sentence.

Optionally, the determining module is configured to: obtain a target keyword, where the target keyword is used to indicate key session content of the historical dialogue; recognize a type of the target keyword; and fill the target keyword to a first target slot corresponding to the type in the target response sentence template, to obtain the target response sentence.

Optionally, the obtaining module is configured to: extract the target keyword from the historical response sentence; or extract the target keyword from a historical reply sentence, in the historical dialogue, of the user for the interaction device; or query configuration information to obtain the target keyword associated with the historical response sentence, where the configuration information includes a preset association relationship between the historical response sentence and the target keyword.

Optionally, the obtaining module is configured to perform named entity recognition on the historical response sentence, and use an obtained common named entity as the target keyword.

Optionally, the obtaining module is configured to perform named entity recognition on the historical reply sentence, and use an obtained common named entity as the target keyword.

Optionally, the determining module is configured to: when it is recognized that required information is missing in the candidate user intent, perform the step of determining a target response sentence of the interaction device for the reply sentence based on the target expected user intent.

Optionally, the determining module is configured to determine, from the plurality of expected user intents associated with the historical response sentence, an expected user intent including the candidate user intent as the target expected user intent.

Optionally, the dialogue system is a terminal. For example, the dialogue system is a mobile phone, a smart speaker, or a chatbot.

Optionally, the dialogue system is a cloud device. For example, the dialogue system is a server.

According to a fifth aspect, a dialogue system is provided. The dialogue system includes a processor. The processor is configured to execute instructions, to enable the dialogue system to perform the response method in a human-computer dialogue according to any one of the first aspect or the optional manners of the first aspect. For specific details of the dialogue system provided in the fifth aspect, refer to any one of the first aspect or the optional manners of the first aspect.

According to a sixth aspect, a dialogue system is provided. The dialogue system includes a processor. The processor is configured to execute instructions, to enable the dialogue system to perform the response method in a human-computer dialogue according to any one of the second aspect or the optional manners of the second aspect. For specific details of the dialogue system provided in the sixth aspect, refer to any one of the second aspect or the optional manners of the second aspect.

According to a seventh aspect, a computer-readable storage medium is provided. The storage medium stores at least one instruction. The instruction is read by a processor, to enable a dialogue system to perform the response method in a human-computer dialogue according to any one of the first aspect or the optional manners of the first aspect.

According to an eighth aspect, a computer-readable storage medium is provided. The storage medium stores at least one instruction. The instruction is read by a processor, to enable a dialogue system to perform the response method in a human-computer dialogue according to any one of the second aspect or the optional manners of the second aspect.

According to a ninth aspect, a computer program product is provided. When the computer program product is run in a dialogue system, the dialogue system is enabled to perform the response method in a human-computer dialogue according to any one of the first aspect or the optional manners of the first aspect.

According to a tenth aspect, a computer program product is provided. When the computer program product is run in a dialogue system, the dialogue system is enabled to perform the response method in a human-computer dialogue according to any one of the second aspect or the optional manners of the second aspect.

According to an eleventh aspect, a chip is provided. When the chip is run in a dialogue system, the dialogue system is enabled to perform the response method in a human-computer dialogue according to any one of the first aspect or the optional manners of the first aspect.

According to a twelfth aspect, a chip is provided. When the chip is run in a dialogue system, the dialogue system is enabled to perform the response method in a human-computer dialogue according to any one of the second aspect or the optional manners of the second aspect.

DESCRIPTION OF EMBODIMENTS

Figure 1:
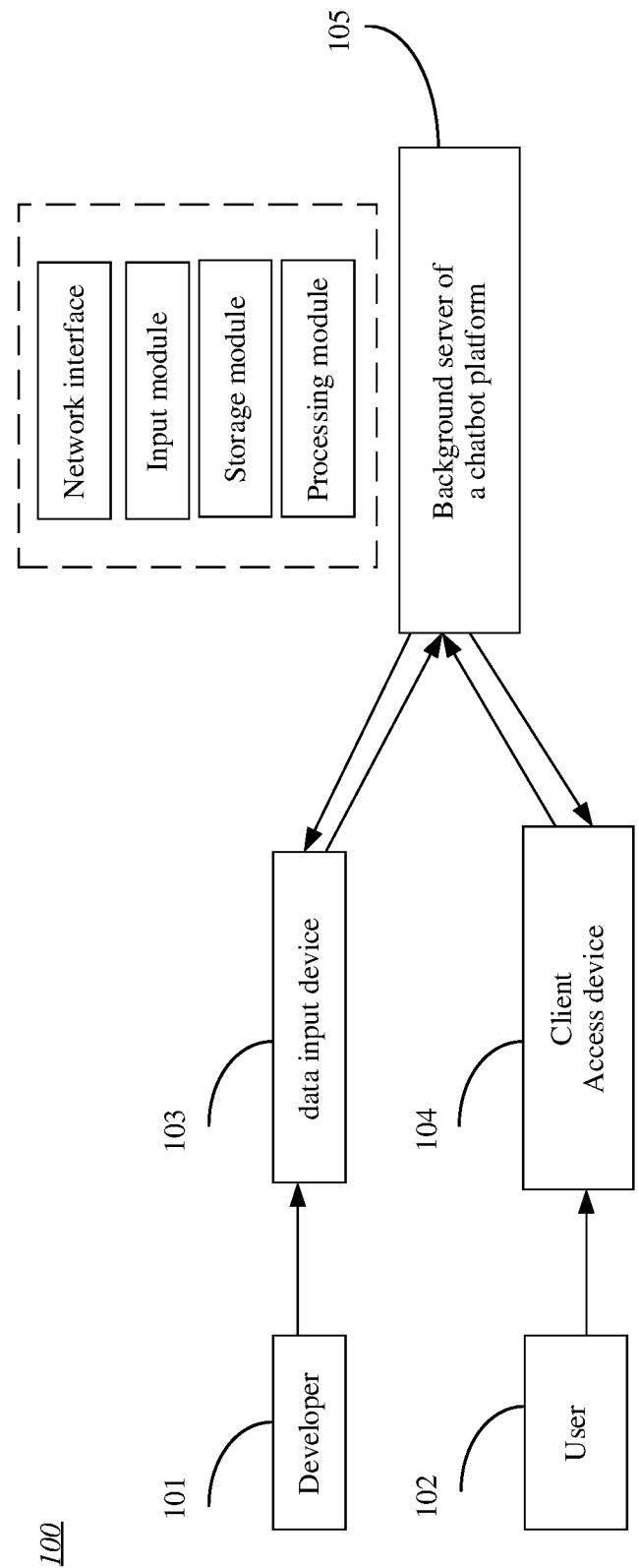
FIG. 1 is an example schematic diagram of a system architecture 100 according to an embodiment of this application.

To make objectives, technical solutions, and advantages of this application clearer, the following further describes implementations of this application in detail with reference to the accompanying drawings.

The following describes an application scenario of this application by using an example.

A method and an apparatus provided in embodiments of this application may be applied to a human-computer dialogue scenario in a natural language processing (NLP) technology. Specifically, embodiments of this application may be applied to a scenario in which a dialogue robot is constructed and semantic understanding and a dialogue service are provided for an end user. In a dialogue system, information is complemented with reference to a context, to support functions such as a chat context, an active recommendation context, a topic redirection context, and an instruction control context, so that a device and a user can coherently perform a plurality of rounds of active recommendation, task, or chat dialogues. For example, the dialogue robot is a child companion education robot, an after-sales automatic answering application, or a pre-sales consultation robot.

For ease of understanding, the following briefly describes a context implementation technology in the human-computer dialogue field.

In a natural language dialogue, coreference and omission are common linguistic phenomena. In an oral dialogue system or an interactive question answering dialogue system, with coreference and omission, a user does not need to use a sentence including complete semantics every time, so that an expression is more concise and natural. However, for natural language understanding, use of coreference and omission leads to absence of a grammatical or semantic element. Understanding a complete real intent of a user in the case of semantic absence is very important for constructing a dialogue system with fluent and natural interaction.

For example, a user first inputs a sentence "How is the weather in Beijing?"; then the user inputs a sentence "Then what about Shanghai?"; and finally, the user inputs a sentence "What about tomorrow?". In this example, the dialogue system may complement missing information within a field. For another example, a user first inputs a sentence "Is Confession Balloon sung by Jay Chou?"; and then the user inputs a sentence "What movies has he been in?". In this example, a dialogue system may complement missing information across fields. For another example, a user first inputs a sentence "Sing a song", and then the user inputs a sentence "One more". In this example, the dialogue system may determine a specific user intent of the user with respect to a general request.

In addition, in communication between people, mutual question answering is a general dialogue form. Therefore, active questioning and recommendation by a dialogue system are critical to improving user experience. In addition, to improve dialogue experience, different response sentences of an interaction device may be set for one user intent. If a response sentence of the interaction device relates to active recommendation or questioning, user intent association and context cohesion need to be performed, so that a dialogue process proceeds normally.

In a possible implementation, coreference and omission in a dialogue are dealt with by using coreference resolution and zero-pronoun resolution technologies. Specifically, a missing semantic element is complemented by using a preconfigured rule or a machine learning algorithm and based on input of a current dialogue and previous N rounds of dialogue history, to obtain a complete sentence, and then intent recognition is performed. For example, the dialogue history includes "Is Confession Balloon sung by Jay Chou?"; a sentence input by a user in the current dialogue is "What movies has he been in?"; and finally, "What movies has Jay Chou been in?" is obtained through complementation. However, this method is difficult, and a best comprehensive evaluation index (F-Measure, F-value) is approximately 70%. In addition, in the case of incorrect complementation, a serious mistake occurs in a subsequent dialogue process.

In another possible implementation, a dialogue process is managed by using a dialogue state tracking (DST) technology and a dialogue policy. Specifically, dialogue history in a large quantity of specific vertical fields (a limited quantity of fields and a limited quantity of slot variables) is learned by using a machine learning algorithm. The DST is to predict a current dialogue state (keyword distribution of slots) by using a system action of a previous round and N best (N-Best) output results of an automatic speech recognition (ASR) module and a natural language understanding (NLU) module. The dialogue policy is to determine a system action of a next step based on the dialogue state. However, this manner has many limitations. A large amount of multi-round dialogue data needs to be used for training, and this manner is limited to a case with a limited quantity of fields and a few slot variables. Otherwise, model complexity is high. N indicates a positive integer.

In another possible implementation, coreference and omission in a dialogue are dealt with by using a skill and a function of a user intent and slot model on a chatbot (bot) platform. Specifically, a developer needs to input sentences or templates of a complete expression and an incomplete (contextual) expression to a user intent (template) on the bot platform, set whether a slot is required, and ask about or clarify a case in which a required slot is missing. For example, a sentence input by a user is "How is the weather?", and the dialogue system needs to ask "Which city are you in, please?", to clearly ask about a location corresponding to the weather user intent. However, a current bot platform mainly supports rapid development of a bot for a specific field, and the bot can support a coreference or omission expression of a user only within the field. In addition, the bot platform does not distinguish between an entrance utterance and a contextual utterance in terms of a user intent. As a result, a same contextual utterance corresponding to different user intents is repeatedly input. For example, sentences input by a user in two dialogues are "How is the weather in Shanghai?" and "What about Beijing?", and sentences input by the user in other two dialogues are "Is there any ticket to Shanghai?" and "What about Beijing?". "How is the weather in Shanghai?" and "Is there any ticket to Shanghai?" are different user intents for asking about weather and ticket booking, but correspond to a same contextual utterance: "What about Beijing?". As a result, the contextual utterance "What about Beijing?" is repeatedly input. In addition, a contextual utterance may trigger clarification. For example, a contextual utterance "today" matching a weather user intent triggers a response sentence "Which city are you in, please?". In addition, in the case of repeated input of a contextual utterance, when filtering results, the dialogue system may not be able to determine a specific contextual utterance whose corresponding user intent is to be selected. For example, when the user inputs the sentence "What about Beijing?", the dialogue system may not be able to determine a specific user intent to be returned. In addition, a response template of the dialogue system or a response sentence generated by the dialogue system may include active dialogue logic. For example, a response sentence output by the dialogue system is "Do you like dinosaurs?", and a sentence input by a user in a next dialogue is "Yes". In this case, a process of the next dialogue cannot be controlled. In addition, the bot platform cannot implement redirection from a general user intent to a specific user intent. For example, a response sentence output by the dialogue system is "May I sing you a song?", and a sentence input by a user in a next dialogue is "okay". The dialogue system can learn, from "okay", a general user intent indicating affirmation, and needs to be redirected from the general user intent indicating affirmation to a user intent for playing the song, so that the dialogue can proceed more fluently.

In another possible implementation, an input context interface and an output context interface are provided for a user intent, to control a dialogue process. Specifically, steps for controlling a dialogue process include the following step (1) to step (3).

Step (1): A developer binds an output context to a user intent A, where the output context is a context_flag (context_flag). The developer binds an input context to a user intent B, where the input context is also a context_flag.

Step (2): A user initiates a request. If a sentence input by the user matches the user intent A, a dialogue system activates the output context. In this case, a current context state includes the context_flag.

Step (3): The user initiates a request again. In this case, the dialogue system preferentially matches the user intent B, and the context_flag may pass a parameter from the user intent A to the user intent B.

However, when the foregoing method is used, the following disadvantages (1) to (3) occur.

Disadvantage (1): If a context needs to be implemented, configuration is complex and tedious, and the developer needs to specifically design and implement a corresponding mechanism.

Disadvantage (2): A same incomplete user utterance or expression has different meanings. In this method, different user intents need to be defined for user utterances and expressions that are repeatedly input, leading to redundancy. For example, if a user expresses "one more", it may indicate one more song or one more dance. In this method, "one more" needs to be repeatedly input, and two user intents need to be created: "one more song" and "one more dance".

Disadvantage (3): Association cannot be directly performed with an existing user intent to associate dialogues, and the existing user intent needs to be rewritten. As a result, corpus that has been input cannot be effectively used to revitalize dialogue resources.

In another possible implementation, a reply to a user intent may be set to lead to another dialogue user intent. Step a and step b are used to control a dialogue process.

Step a: A developer sets a reply to a user intent A to lead to another dialogue user intent, and configures expected user request content in a next round to content_B, and a corresponding user intent B.

Step b: A user initiates a request. If content of the request matches the content_B, the request matches the user intent B.

However, when the foregoing method is used, the following disadvantage (a) and disadvantage (b) occur.

Disadvantage (a): When configuring the expected user request content in the next round, the developer cannot fully cover expressions of the user. As a result, no user intent can be matched. For example, the expected user request content is "yes", but content actually expressed by the user may be "okay", "Hmm", "YES", or the like.

Disadvantage (b): Same expected user request content in a next round is configured for different user intents, leading to configuration redundancy. For example, expected user request content "one more" in a next round and a corresponding user intent "sing a song" are configured for the user intent "sing a song", and expected user request content "one more" in a next round and a corresponding user intent "have a dance" are configured for the user intent "have a dance".

With reference to the foregoing background, in some embodiments of this application, a specific context understanding capability needs to be implemented based on a bot platform, and includes the following aspects (1) to (3).

(1) Understanding of a user intent in a case of an incomplete user utterance or expression needs to be supported. The case of an incomplete utterance is usually caused by use of coreference or omission.

(2) Diversity of replies of a dialogue system after a user intent is matched needs to be supported. In addition, if a topic recommendation or a topic redirection is included in a reply, association with a user intent in a next round needs to be supported, to implement slot inheritance.

(3) Some common named entities exist in dialogue history, and need to be shared across user intents as slots.

In view of this, some embodiments of this application provide a method and an apparatus for configuring a context of a dialogue system, to meet the foregoing several requirements on a bot platform, implement user intent association and context cohesion between a plurality of rounds of dialogues, and improve interaction experience with a dialogue robot. Technical problems to be resolved in some embodiments of this application include the following (1) to (6).

(1) To resolve a problem that context configuration is complex and tedious, a simple and convenient context configuration solution is designed.

(2) Input and parsing of incomplete expressions are supported, thereby resolving the following problem of a conventional solution: Expressions of a same type need to be repeatedly input, and a specific user intent to be returned for expressions of a same type cannot be determined, that is, the disadvantage (2).

(3) Association between a response sentence for a user intent and an expected user intent of a next dialogue and association between the response sentence for the user intent and a redirect-to user intent possibly corresponding to the expected user intent of the next dialogue are supported. Specifically, configuration of an expected reply sentence of a user for an interaction device in the next dialogue is changed to configuration of the expected user intent and the redirect-to user intent. This overcomes the disadvantage (a) and the disadvantage (b), and also overcomes the disadvantage (3).

(4) A common named entity slot in dialogue history is reused to fill a missing slot in an incomplete expression of a user, thereby resolving a problem that the current bot platform cannot reuse a common named entity slot in dialogue history (across user intents).

(5) Inheritance and redirection may be performed by using a slot and a user intent that have been input in a dialogue system, thereby greatly reducing an amount of repeated development.

(6) A limitation that a coreference or omission expression can be supported only in a same field is eliminated, thereby helping easily implement a cross-field context.

In some of the following embodiments, a method for configuring a reply to a user intent is provided first, including: configuring an expected user intent and a redirect-to user intent for a response sentence for a user intent, and configuring a keyword that needs to be passed to a next dialogue. User intent association and slot inheritance between a current dialogue and a next dialogue are implemented by obtaining and processing configuration information.

Then a method for configuring a user intent type and user intent association is provided. User intent types are classified into an entrance intent and a context intent. The entrance intent is a complete expression of a user for describing a specific requirement. The context intent is an incomplete expression of a user for a specific requirement. In addition, obtaining a type configured for a user intent and another user intent associated with the user intent is supported. In this way, continuity of a plurality of rounds of dialogues within a field is achieved, and an error of matching a context intent in the absence of a context is avoided.

Finally, a configuration about whether to use a common named entity is provided for a user intent. A common named entity slot can be shared across user intents by obtaining and processing configuration information.

With the foregoing technical points, a new context development apparatus is provided, to help easily implement context control, dialogue process control, active recommendation, and a plurality of rounds of task or chat dialogues on a content development platform.

Embodiments of this application relate to application of an NLP technology. Therefore, for ease of understanding, the following first describes related concepts of terms in the NLP technology included in embodiments of this application.

A user intent is used to describe a purpose of voice interaction between a user and a machine, for example, booking a ticket, asking about weather, or talking about a topic, for example, talking about an animal.

A slot is used to describe some parameter information in a user intent, for example, a departure time, a departure place, and a destination for booking a ticket.

Slot extraction: In an NLP task, for input text content, a dialogue system may extract, based on some specific structured fields, structured information included in the text content. For example, the text content is "How is the weather today?", and the dialogue system may extract a keyword indicating time: "today". For example, the text content is "I want to go to Shenzhen", and the dialogue system may extract a keyword indicating a location: "Shenzhen".

A to-be-supplemented slot is a vacant slot in a response sentence that needs to be returned by a dialogue system. A process of adding a keyword to the to-be-supplemented slot is referred to as slot filling. Information can be complemented through slot filling, thereby helping convert a user intent into an explicit user instruction.

A bot stands for a chatbot, namely, an intelligent dialogue robot, and is also referred to as a virtual assistant (VA). A core of the bot is an intelligent dialogue system based on natural language understanding, and the intelligent dialogue system integrates artificial intelligence technologies such as knowledge management and learning, intelligent speech, and image recognition. A bot platform is a currently popular framework or tool for constructing a dialogue robot. A developer may define a user intent and a slot on the bot platform, add dialogue corpus, and perform simple labeling. Then the bot platform may train a model to provide NLU and dialogue capabilities for a user (a service object of the dialogue robot).

The following describes a system architecture provided in embodiments of this application.

As shown in FIG. 1, an embodiment of this application provides a system architecture 100. The system architecture 100 includes a data input device 103, a client access device 104, and a server 105. Optionally, the data input device 103 and the client access device 104 are terminals. For example, the terminal is a smartphone, a desktop computer, a tablet computer, or a notebook computer. The server 105 includes at least one of one server, a plurality of servers, a cloud computing platform, and a virtualization center.

A developer 101 inputs a user intent, a response sentence, and slot data by using the data input device 103. The data input device 103 transmits input data to the server 105. The server 105 performs data storage and model training on the input data, and provides a semantic understanding or human-computer dialogue capability. A user 102 sends a semantic understanding or human-computer dialogue request to the server 105 by using the client access device 104, and the server 105 returns a semantic understanding result or a dialogue response sentence to the client access device 104.

An application program supporting a bot platform is installed and run on the data input device 103, and the application program may be a client of the bot platform. The application program may provide a configuration interface of the bot platform, so that the developer can input a user intent, a response sentences, and slot data on the configuration interface.

The server 105 is configured to provide a background service for the bot platform, in other words, the server 105 may be a background server of the bot platform. Optionally, in a process of processing a service by the bot platform, the server 105 performs primary processing work, and the data input device 103 performs secondary processing work; or the server 105 performs secondary processing work, and the data input device 103 performs primary processing work; or the server 105 or the data input device 103 may separately perform processing work; or the server 105 and the data input device 103 perform collaborative computing by using a distributed computing architecture.

The bot platform may be configured to provide, deploy, and run a human-computer dialogue application. For example, the human-computer dialogue application is a dialogue robot application. The human-computer dialogue application may be a client application or a web application. The human-computer dialogue application may be an independent application program, or may be an applet or a service embedded in an application client, for example, an instant messaging application or a shopping application. For example, the human-computer dialogue application may be an intelligent customer service in a shopping application, or a recruitment assistant at a recruitment website.

A human-computer dialogue application is installed and run on the client access device 104, and the user may input a sentence by using the client access device 104. Optionally, in a process of a human-computer dialogue, the server 105 performs main processing work, for example, the server 105 performs a task of generating a response sentence based on a reply sentence of the user for an interaction device, and the client access device 104 performs secondary processing work, for example, the client access device 104 is responsible for collecting a sentence input by the user, playing voice including a response sentence, or displaying a response sentence on a screen; or the server 105 performs secondary processing work, and the client access device 104 performs primary processing work; or the server 105 or the client access device 104 may separately perform processing work; or the server 105 and the client access device 104 perform collaborative computing by using a distributed computing architecture.

In the foregoing system architecture 100, an overall logical functional architecture is described from a perspective of hardware. The following describes functional modules included in the following method embodiments by using a system architecture 200. Different functional modules in the system architecture 200 may be located on a same device or different devices in the system architecture 100.

Figure 2:
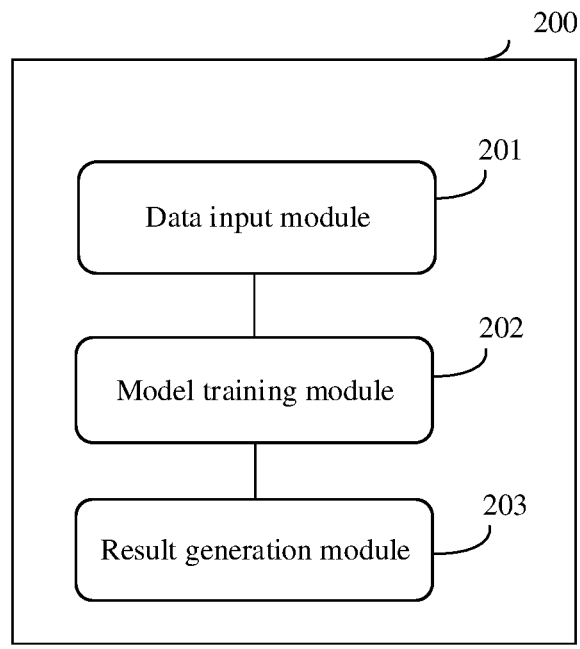
FIG. 2 is an example schematic diagram of a system architecture 200 according to an embodiment of this application.

As shown in FIG. 2, the system architecture 200 includes a data input module 201, a model training module 202, and a result generation module 203.

The data input module 201 is configured to receive a user intent and a keyword that are configured by a developer on an interface. In some embodiments of this application, a developer is supported in configuring an entrance intent and a context intent on an interface, and the data input module 201 may receive the entrance intent and the context intent. In some embodiments of this application, using, in a user intent, a common named entity slot extracted by a system is supported, and the data input module 201 may receive the common named entity slot. In some embodiments of this application, a developer is supported in specifying an expected user intent and a redirect-to user intent in a response sentence of for a user intent, and the data input module 201 may receive the expected user intent and the redirect-to user intent, and store an association relationship between the response sentence, the expected user intent, and the redirect-to user intent. The data input module 201 may be located in the data input device 103 or the server 105 in the system architecture 100. The data input module 201 may provide data input by the developer to the model training module 202.

The model training module 202 is configured to train an intent recognition model by using the data input by the developer and a machine learning algorithm. The model training module 202 may provide the trained intent recognition model to the result generation module 203. The model training module 202 may be located in the server 105 in the system architecture 100.

The result generation module 203 is configured to: receive a request packet from the client access device 104, parse the request packet to obtain a sentence input by a user in a current dialogue, perform prediction by using the intent recognition model obtained by the model training module 202, and generate a final semantic parsing result or dialogue reply with reference to dialogue history, the expected user intent, or the redirect-to user intent.

The data input module 201, the model training module 202, and the result generation module 203 are implemented by using software, and are specifically implemented through programming, for example, by using program code or instructions. Data and instructions may be stored in various types of memories, for example, a read-only memory (ROM) or another type of static storage device capable of storing static information and instructions, a random access memory (RAM) or another type of dynamic storage device capable of storing information and instructions, an electrically erasable programmable read-only memory (EEPROM), a disk storage medium or another magnetic storage device, or any other medium that can be configured to carry or store expected program code in a form of an instruction or a data structure and that can be accessed by a search apparatus in this case. Execution of an instruction or a functional module may be implemented by a processor or a controller, for example, a central processing unit (CPU) or a digital signal processor (DSP).

The foregoing describes the system architecture from perspectives of hardware and software by using the system architecture 100 and the system architecture 200 respectively. The following describes, by using an example and from perspectives of configuration, model training, and reply generation, a process of a method for providing a human-computer dialogue service based on the system architecture provided above. Specifically, a method 300 for configuring a context of a dialogue system according to an embodiment of this application relates to data input and storage processes, and how to configure data such as user utterances, various user intents, response sentences for user intents, and slots in a dialogue system to finally obtain an association relationship between a response sentence, a user intent, and slot data is mainly described. A model training method 400 for a human-computer dialogue according to an embodiment of this application relates to model training processes, and how to train an intent recognition model and a slot extraction model in a dialogue system is mainly described. A response method 410 in a human-computer dialogue according to an embodiment of this application relates to reply generation processes, and how to generate a response sentence in a dialogue system in a human-computer dialogue process is mainly described. It should be noted that the method 300, the method 400, and the method 410 provided in embodiments of this application includes technology produced based on a same concept, and may also be understood as three parts in a dialogue system or three stages of a whole process, for example, a configuration stage for providing a human-computer dialogue service, a model training stage for providing a human-computer dialogue service, and a reply generation stage for providing a human-computer dialogue service. Mutual reference may be made between the method 300, the method 400, and the method 410. For details not shown in an embodiment, refer to other embodiments.

Figure 3:
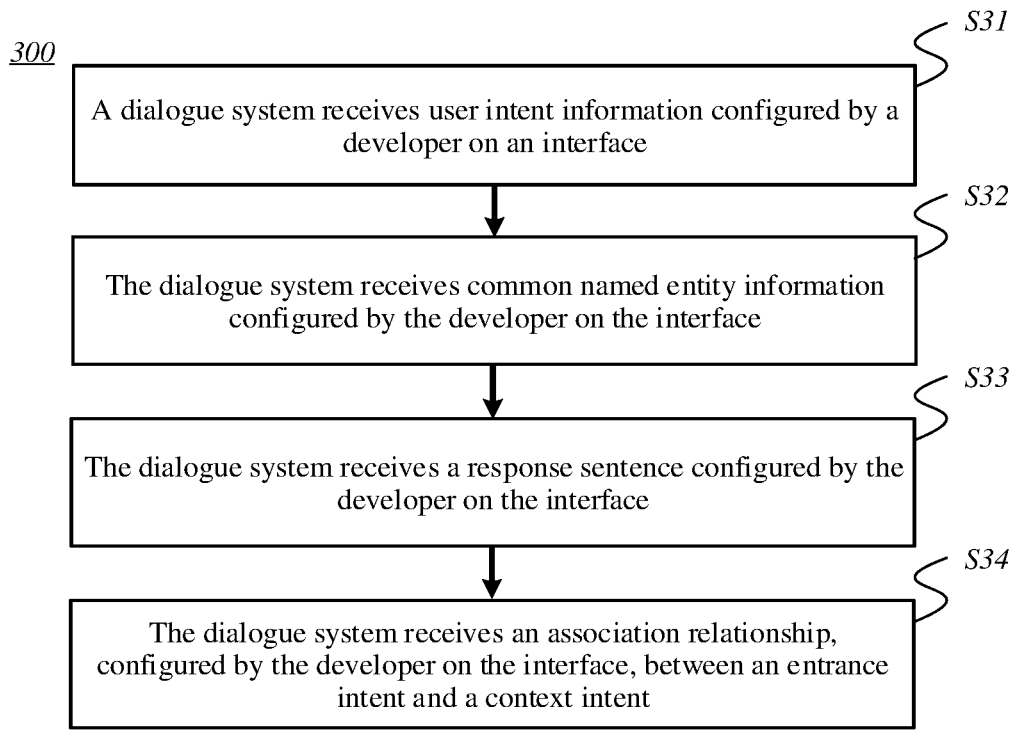
FIG. 3 is an example flowchart of a method for configuring a context of a dialogue system according to an embodiment of this application.

FIG. 3 is a flowchart of a method 300 for configuring a context of a dialogue system according to an embodiment of this application.

Optionally, the method 300 is performed by the server 105 in the system architecture 100, and a user intent, a response sentence, and slot data in the method 300 may be sent by the data input device 103 to the server 105. Optionally, the method 300 is performed by the data input module 201 in the system architecture 200. Optionally, the method 300 is performed by a CPU.

For example, the method 300 includes S31 to S34.

S31: A dialogue system receives user intent information configured by a developer on an interface.

Optionally, the dialogue system is a chat dialogue system. For example, the dialogue system is a robot platform corresponding to a chatbot. For example, the dialogue system is a bot platform. Certainly, the dialogue system may be alternatively a task dialogue system or a question answering dialogue system.

The user intent information includes at least one of an intent name of a user intent, a user intent type, a user utterance, and a response sentence.

Figure 4:
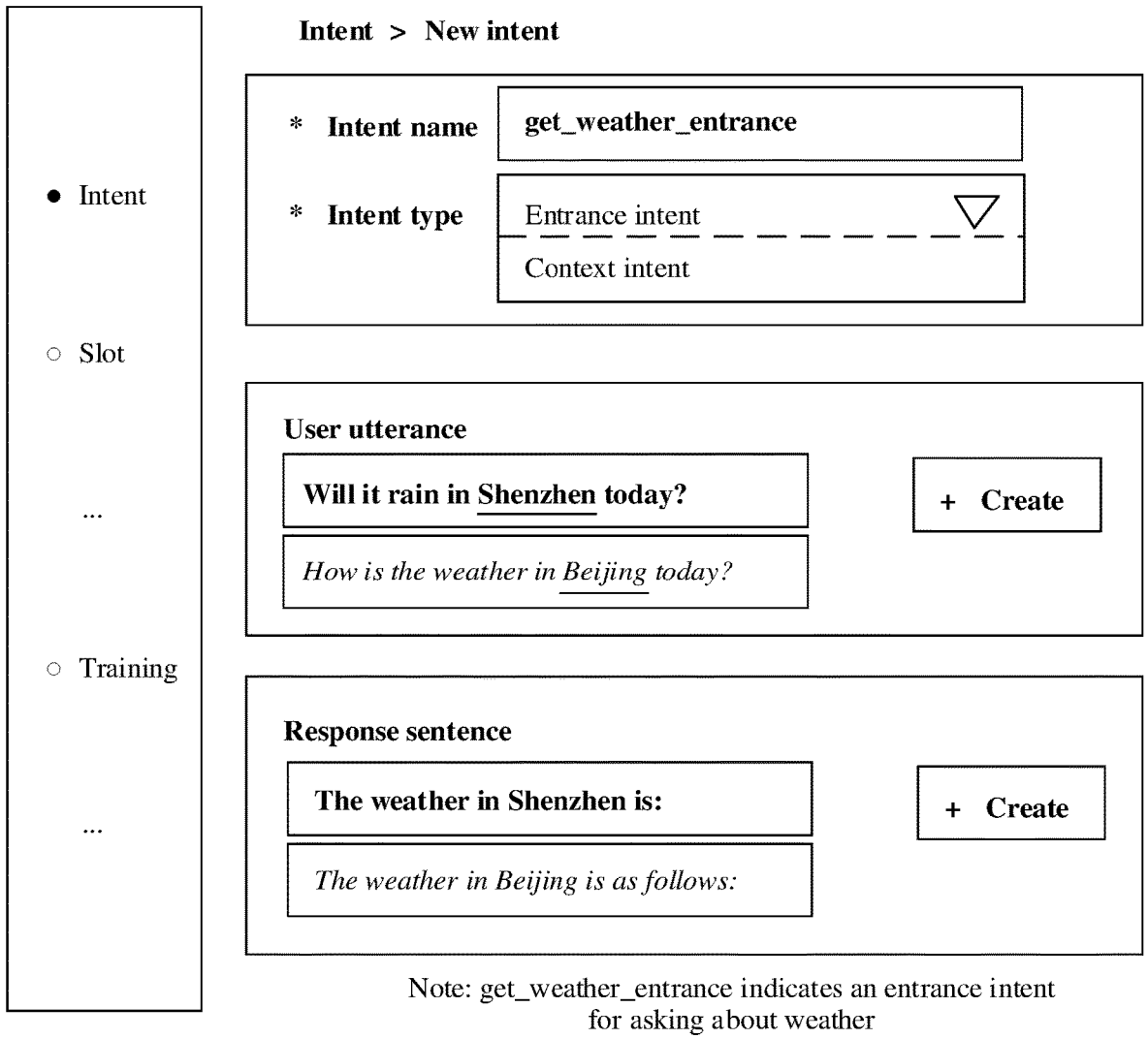
FIG. 4 is an example schematic diagram of a configuration interface of a dialogue system according to an embodiment of this application.

Specifically, in this embodiment, logic of an entrance intent and a context intent is introduced into the dialogue system, and user intent types are classified into an entrance intent and a context intent. When configuring a user intent, the developer may select a type from the entrance intent and the context intent, and configure the user intent as the user intent type. In a possible implementation, the dialogue system may allow, by using a user interface (UI), the developer to input a user intent and a corresponding user intent type. For example, as shown in FIG. 4, the dialogue system may provide a new user intent interface. The new user intent interface includes a user intent type menu. The user intent type menu includes an entrance intent option and a context intent option. After triggering a selection operation on one of the options, the developer may configure a type of a currently created user intent to a type corresponding to the selected option.

An entrance intent is a user intent expressed by using a complete sentence. In other words, an entrance intent is a complete expression of a user for describing a requirement. For example, the entrance intent is "weather in Shenzhen today", "play a song of Faye Wong", or "have a dance". After a user inputs a sentence (namely, a reply sentence in the following descriptions), if the sentence input by the user matches the entrance intent, the dialogue system may select a response sentence from a response sentence corresponding to the entrance intent, and use the selected response sentence to reply to the sentence input by the user, so as to directly return a result. For brevity, in this embodiment of this application, a specific entrance intent is expressed in a simplified manner in a form of "intent name+entrance" without causing difficulty in understanding. For example, the specific entrance intent is "get_weather_entrance".

A context intent is a user intent expressed by using an incomplete sentence. Specifically, an expression corresponding to the context intent is an incomplete expression for describing a requirement. For example, a coreference expression and/or an omission expression are/is used in a user utterance corresponding to the context intent. When input of a user corresponds to the context intent, a requirement of the user usually needs to be determined with reference to a historical dialogue. For example, the context intent is "What about tomorrow?", "little white rabbit", "Then what about Beijing?", or "one more". For brevity, in this embodiment of this application, a specific context intent is expressed in a simplified manner in a form of "context+intent name" without causing difficulty in understanding. For example, the specific context intent is "context_yes".

Optionally, in a process of establishing a context intent, the developer may configure, for the context intent, a user utterance expressed by using an incomplete sentence, and the dialogue system may receive the context intent and the user utterance expressed by using the incomplete sentence, and subsequently train an intent recognition model by using the context intent and the user utterance expressed by using the incomplete sentence. Optionally, a plurality of incomplete sentences with same semantics are input for one context intent. For example, user utterances such as "okay", "Hmm", and "YES" are input for context_yes, where context_yes is a context intent indicating affirmation.

In some embodiments, a restrictive condition is introduced for matching of a context intent. Specifically, by default, a sentence input by a user (for example, a reply sentence of the user for an interaction device) in a current dialogue does not match a context intent; or when a sentence input by a user (for example, a reply sentence of the user for an interaction device) in a current dialogue meets a preset condition, a user intent corresponding to the sentence input by the user matches a context intent. In other words, a context intent can be matched only when a preset condition is met, thereby avoiding an error of matching a context intent in the absence of a context.

The preset condition includes at least one of a preset condition (1) or a preset condition (2).

Preset condition (1): An entrance intent associated with a context intent is matched in a previous dialogue. In other words, if an association relationship is established between a context intent A and an entrance intent B and a sentence input by a user (for example, a reply sentence of the user for an interaction device) in a historical dialogue (for example, a previous dialogue) matches the entrance intent B, a candidate user intent corresponding to a sentence input by the user (for example, a reply sentence of the user for the interaction device) in a current dialogue can match the context intent A.

Preset condition (2): A context intent belongs to an expected user intent corresponding to a response sentence in a previous dialogue, or a context intent belongs to a user intent specified by a sentence input by a user (for example, a reply sentence of the user for an interaction device) in a current dialogue.

As shown in FIG. 4, on the new user intent interface, the developer may name a user intent of "asking about weather" as get_weather_entrance, and the developer may select "Entrance intent" as a type of the user intent of "asking about weather". The developer inputs a user utterance corresponding to the user intent of "asking about weather". For example, the user utterance is "weather in Beijing today" or "Will it rain in Shenzhen today?". The developer adds the user intent of "asking about weather" to user utterance training corpus, so that the user intent can be subsequently used to train a user intent classification model. In addition, the developer adds a corresponding response sentence for the user intent of "asking about weather". For example, the corresponding response sentence is "The weather in Beijing is as follows:" or "The weather in Shenzhen is:".

Optionally, in a human-computer dialogue, content of a response sentence in the dialogue includes at least one of the following use manners (1) to (3). To distinguish between a sentence initiated by a user and a sentence initiated by a machine, a sentence initiated by a user is referred to as a reply sentence, and a sentence initiated by a machine is referred to as a response sentence.

Use manner (1): The dialogue system directly uses a preconfigured response sentence to reply to a sentence input by a user (for example, a reply sentence of the user for an interaction device) in a current dialogue.

For example, the sentence input by the user (for example, the reply sentence of the user for the interaction device) in the current dialogue is "How are you feeling?", and a response sentence configured by the developer for the reply sentence of the user for the interaction device is "I feel great.". In this example, the dialogue system may directly use "I feel great." to reply to "How are you feeling?".

Use manner (2): The dialogue system uses a preconfigured response sentence as a prefix to reply to a reply sentence of a user for an interaction device.

Specifically, the dialogue system generates a final response sentence based on the preconfigured response sentence and other content. For example, a response sentence configured by the developer for the reply sentence of the user for the interaction device is "The weather in Beijing is: XX". In this example, the dialogue system may use "The weather in Beijing is" as a prefix, and generate specific content of "XX" based on a user intent and a keyword. For example, if the keyword is Beijing, the dialogue system calls a weather service based on "Beijing" to learn that the weather in Beijing is "light rain", and replaces XX in the configured response sentence with "light rain", and a generated final response sentence is "The weather in Beijing is: light rain".

Optionally, a common named entity or another keyword in the preconfigured response sentence is replaced based on a parameter in the reply sentence of the user for the interaction device. For example, a response sentence configured by the developer for the reply sentence of the user for the interaction device is "The weather in Beijing is: XX". In this example, the place name "Beijing" may be alternatively replaced based on the parameter in the reply sentence of the user for the interaction device. For example, if the reply sentence of the user for the interaction device is "Then what about the weather in Shenzhen?", the dialogue system may replace "Beijing" in "The weather in Beijing is: XX" with "Shenzhen", call the weather service based on "Shenzhen" to learn that the weather in Shenzhen is "light rain", replace XX with "light rain", and reply to the user by using "The weather in Shenzhen is: light rain".

Use manner (3): The dialogue system does not use a preconfigured response sentence.

In this use manner, content of the preconfigured response sentence may be empty or special text, for example, NO_REPLY (indicating that there is no reply). The dialogue system performs user intent understanding and slot extraction without generating a specific reply. For example, the dialogue system does not use the NO_REPLY information to reply.

Figure 5:
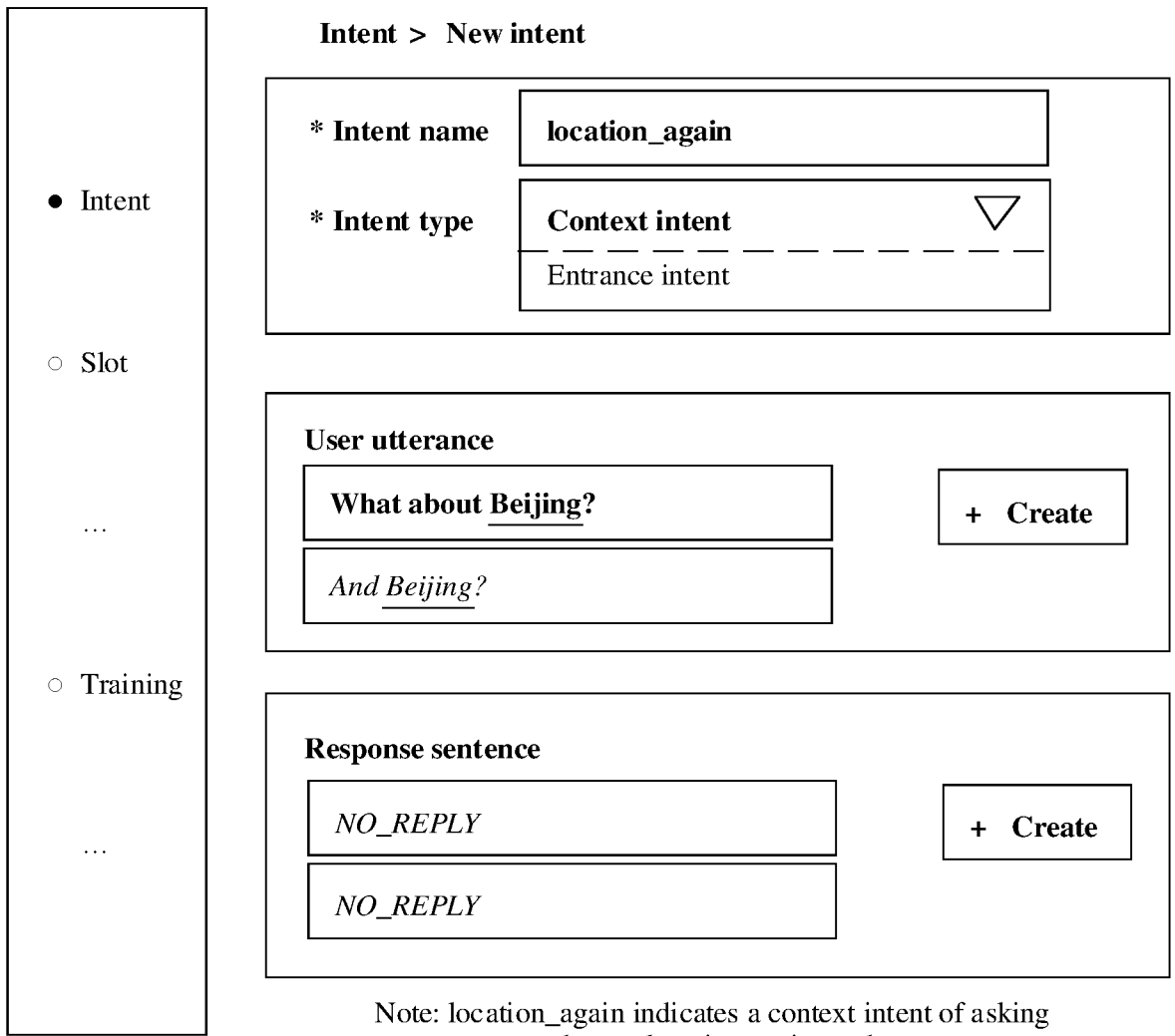
FIG. 5 is an example schematic diagram of a configuration interface of a dialogue system according to an embodiment of this application.

For example, FIG. 5 shows a context intent creation interface. On the creation interface, the developer may create a user intent and configure an intent name to location_again (indicating that a location is asked about again), and the developer may select "Context intent" as a type of the user intent "location_again". The developer adds a user utterance corresponding to the user intent "location_again". For example, the user utterance is "What about Beijing?" or "Then what about Beijing?". The developer adds a response sentence corresponding to "location_again". If the response sentence for the context intent "location_again" is not used by the dialogue system, the developer may set the response sentence for "location_again" to be empty, or set the response sentence for "location_again" to special characters. For example, the special characters are NO_REPLY.

Step S31 provides a method for configuring a user intent type and user intent association. User intent types are an entrance intent and a context intent. Configuration of user intent association is to associate a user intent A with a user intent B, where the user intent B is an expected user intent of the user intent A. By performing step S31, the developer defines an entrance intent and a context intent in the dialogue system. By introducing and processing an entrance intent and a context intent, the developer can quickly construct a multi-round dialogue skill in the dialogue system, thereby eliminating complex context (user intent and slot) association and management work, and reducing development difficulty. In addition, because the developer may input one context intent for a same type of utterance, each expression of a same type of utterance has a common context intent, thereby eliminating repeated input by the developer for a same type of utterance, reducing workload caused by separately inputting, by the developer, a context intent for each expression of a same type of utterance, and improving user intent input efficiency. In addition, in this configuration manner, the developer is allowed to associate an entrance intent with a context intent in the dialogue system, and allowed to associate a plurality of context intents with one entrance intent. Therefore, when a plurality of rounds of dialogues all fall in an associating user intent set of an entrance intent and a context intent, automatic association between a context intent and a corresponding entrance intent can be implemented, and automatic inheritance and succession of slots between the context intent and the corresponding entrance intent can be implemented, thereby reducing context maintenance work of the developer. Association between a context intent and an entrance intent may be implemented by using logic of an expected user intent. For details, refer to the following method 410.

Figure 6:
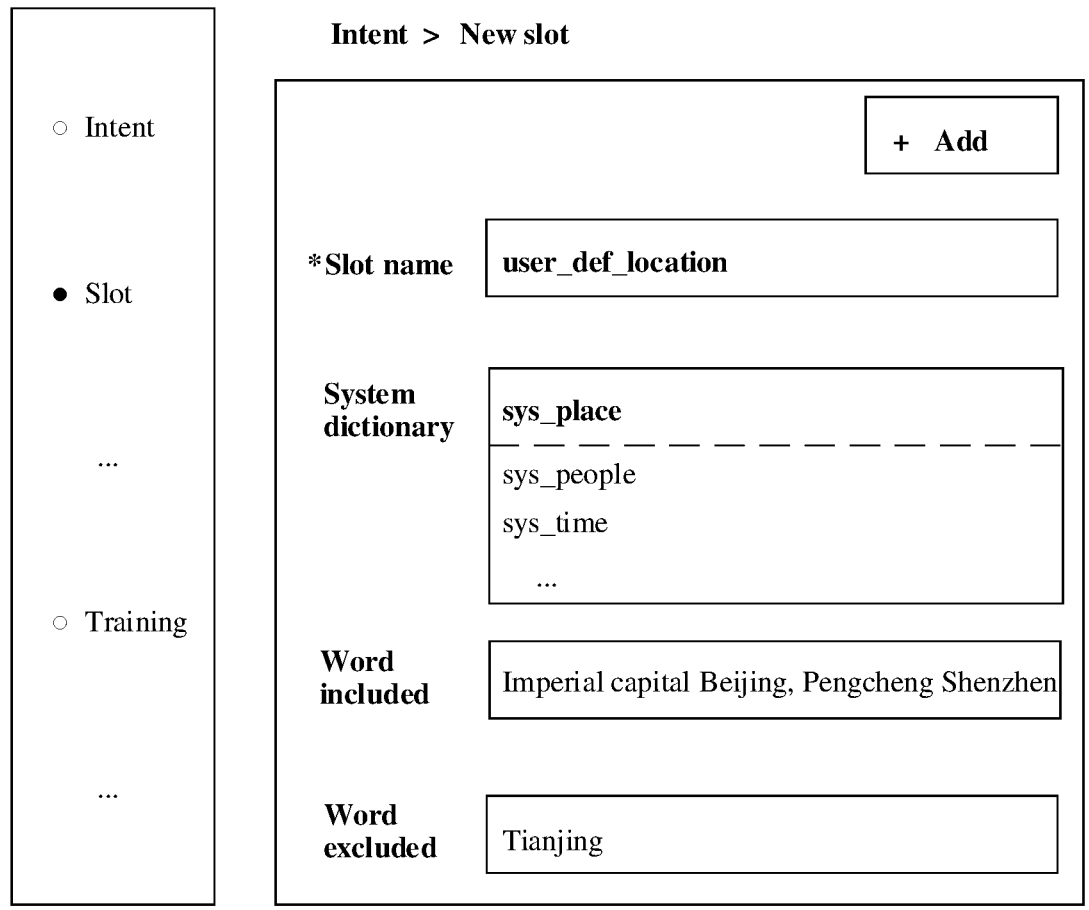
FIG. 6 is an example schematic diagram of a configuration interface of a dialogue system according to an embodiment of this application.

In some embodiments, the developer may add a slot in the dialogue system. For example, a UI interface of the dialogue system allows the developer to input a slot name and a keyword. FIG. 6 is a schematic diagram of a new slot interface. Each slot includes a slot name. For example, the slot name is user_def_location (indicating a user-defined location). The developer may use a term in a system dictionary or a built-in dictionary as a keyword. For example, the developer may use a place name (sys_place), a person name (sys_people), or a time (sys_time) in the system dictionary. In addition, the developer may specify a term included in a keyword. In addition, the dialogue system supports use of synonyms as keywords. For example, Shenzhen and Pengcheng, which are a pair of synonyms, may be used as keywords. In addition, if the developer finds that a term in the system dictionary is inappropriate, the inappropriate term may be excluded.

In some embodiments, logic of sharing a slot across user intents is introduced in the dialogue system. Specifically, a same context state is maintained for an entrance intent and a context intent associated with the entrance intent. The context state is a keyword. A keyword of a slot with a different name may be automatically inherited. Specifically, if an entrance intent and a context intent have slots with different slot names, a keyword in the context intent may inherit a keyword in the entrance intent. A value of a slot with a same name is automatically overwritten. Specifically, if an entrance intent and a context intent have slots with a same slot name, a keyword in the context intent may remain the keyword of the context intent.

For example, a reply sentence A of a user for an interaction device in a previous dialogue is "How is the weather in Beijing today?", and the reply sentence A of the user for the interaction device has two slots, where a keyword with a slot name "loc" is Beijing, and a keyword with a slot name "date" is today; and a reply sentence B of the user for the interaction device in a current dialogue is "Then what about tomorrow?", and the reply sentence B of the user for the interaction device has one slot, where a keyword with a slot name "date" is tomorrow. In this example, a user intent of the reply sentence A of the user for the interaction device is an entrance intent, and a user intent of the reply sentence B of the user for the interaction device is a context intent. The reply sentence A of the user for the interaction device and the reply sentence B of the user for the interaction device have a slot with a different name: "loc". The reply sentence B of the user for the interaction device may inherit the keyword "Beijing" of the slot "loc" in the reply sentence A of the user for the interaction device. The reply sentence A of the user for the interaction device and the reply sentence B of the user for the interaction device have slots with a same name: "date". The keyword "tomorrow" of "date" in the reply sentence B of the user for the interaction device may automatically overwrite the keyword "today" of "date" in the reply sentence A of the user for the interaction device. After slot sharing is performed, a keyword of the slot "loc" in the reply sentence B of the user for the interaction device is "Beijing", and a keyword of the slot "date" in the reply sentence B of the user for the interaction device is "tomorrow".

In addition, when both a reply sentence of a user for an interaction device in a previous dialogue and a required slot is missing in a reply sentence of the user for the interaction device in a current dialogue, the dialogue system may trigger clarification logic. For example, a reply sentence a of a user for an interaction device in a previous dialogue is "Book a movie ticket", and a movie name and a watching time are missing in the reply sentence a of the user for the interaction device. For the dialogue system, a keyword of a slot "name" in the reply sentence a of the user for the interaction device is missing, and a keyword of a slot "time" is also missing. The dialogue system may reply to the reply sentence a of the user for the interaction device by using "What movie would you like to watch?", to clarify the movie name, in other words, the keyword of the slot "name". After the dialogue system replies, the user initiates a reply sentence b "Wolf Warrior" of the user for the interaction device in a current dialogue. A keyword of a slot "name" in the reply sentence b of the user for the interaction device is Wolf Warrior, and a keyword of a slot "time" is still missing. The dialogue system may reply to the reply sentence b of the user for the interaction device by using "What session would you like to book?", to clarify the watching time, in other words, the keyword of the slot "time".

In some embodiments, a globally shared slot set is introduced in the dialogue system. The globally shared slot set stores a shared slot set automatically extracted by the dialogue system or a shared slot set updated by using an application programming interface (API). Optionally, the globally shared slot set is a common named entity set, and the globally shared slot set includes at least one common named entity. For example, the globally shared slot set includes but is not limited to a common named entity such as a time, a location, or a person name. There are a plurality of cases in which the globally shared slot set is used. For example, for some context intents, the developer specifies that a user utterance corresponding to the context intent needs to include a global slot to trigger the context intent. In this case, when the dialogue system receives a reply sentence, corresponding to the user utterance, of a user for an interaction device, the dialogue system uses the globally shared slot set, to trigger the context intent. For example, an intent name of a context intent is "context.age", a user utterance configured for the context intent is "How old is he?", and a global slot is specified for the context intent: PEOPLE@global.slots. With this configuration, when a user inputs a sentence "How old is he?" and a global slot includes a variable PEOPLE, the context intent "context.age" is matched. In addition, a service caller that calls the dialogue system may access the globally shared slot set by using an API.

S32: The dialogue system receives common named entity information configured by the developer on the interface.

Figure 7:
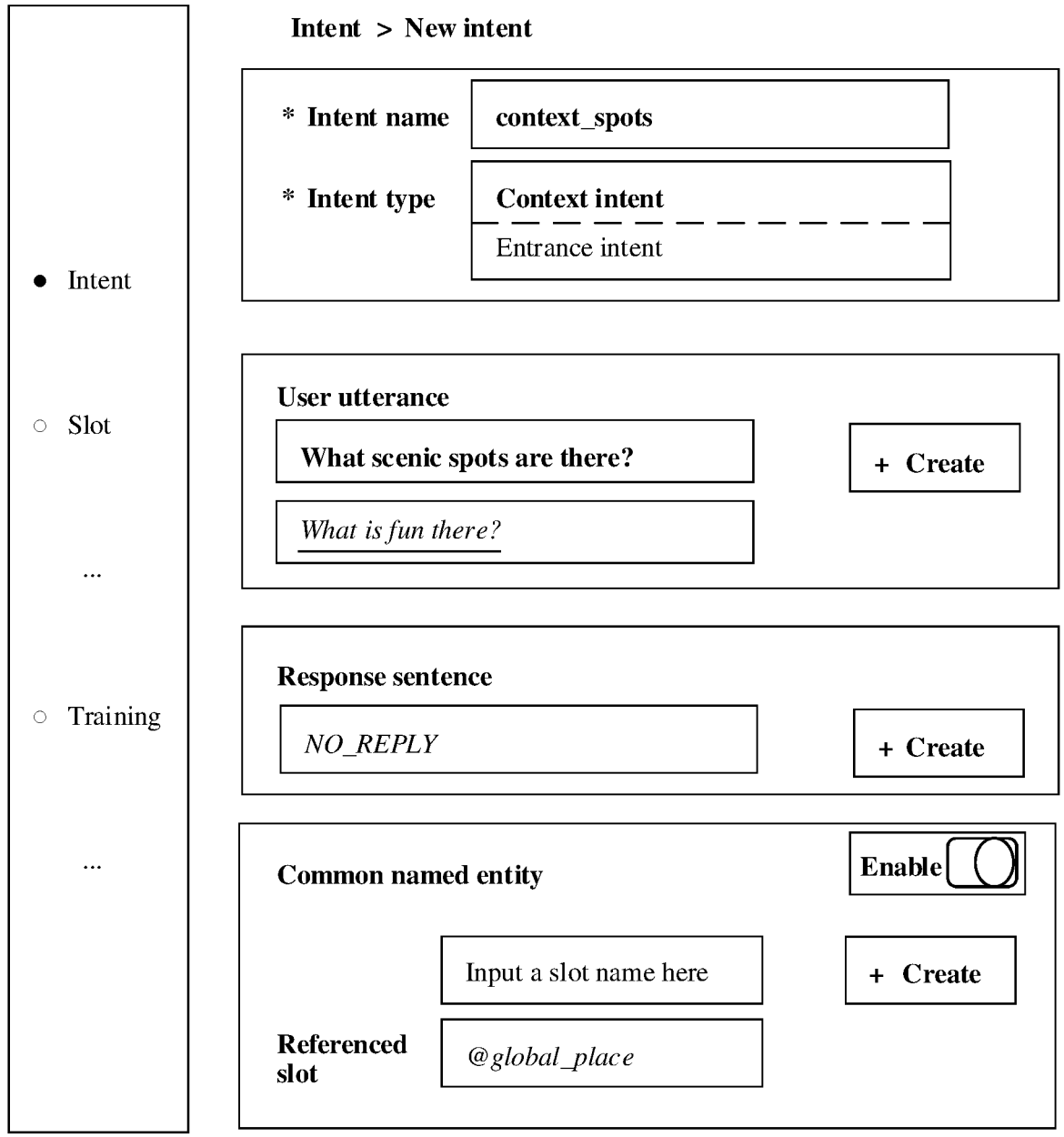
FIG. 7 is an example schematic diagram of a configuration interface of a dialogue system according to an embodiment of this application.

Specifically, the developer may configure use of the common named entity information in a user intent, and the common named entity information may be shared and used across user intents. For example, FIG. 7 shows an example in which a common named entity is used for a user intent. For some user intents, if the dialogue system needs to reference a common named entity shared across user intents, the developer may configure, on a new user intent interface, enabling of use of the common named entity, and configure a slot name for referencing the common named entity. For example, a context intent means "asking about a scenic spot", and a user utterance supported by the context intent includes a pronoun "there". The developer may configure use of a common named entity in a process of creating the context intent indicating "asking about a scenic spot". For example, the common named entity is place name information (global_place). In a process of a human-computer dialogue, after the dialogue system obtains a candidate user intent based on a reply sentence of a user for an interaction device, if the obtained candidate user intent is a user intent in which a common named entity is used, when both a user intent classification result and a referenced slot meet a condition, the dialogue system adds the candidate user intent to a final candidate user intent set.

In step S32, a method for configuring whether to use a common named entity in a user intent is provided from a perspective of a user intent.

S33: The dialogue system receives a response sentence configured by the developer on the interface.

The developer may configure at least one response sentence for each user intent, and the dialogue system receives the configured user intent and at least one response sentence, and establishes and stores an association relationship between the user intent and the at least one response sentence. In a process of a human-computer dialogue, after obtaining a reply sentence of a user for an interaction device, the dialogue system finds, from the preconfigured user intent based on a candidate user intent corresponding to the reply sentence of the user for the interaction device, a target user intent matching the candidate user intent; and selects a final response sentence from a response sentence preconfigured for the target user intent.

In this embodiment, logic of an expected user intent and user intent redirection is introduced in the dialogue system. Each response sentence may specify an expected user intent in a next dialogue. In addition, optionally, each response sentence may specify a redirect-to user intent obtained after an expected user intent is matched and a slot that needs to be passed, to implement user intent association and slot succession between a current dialogue and a next dialogue.

The expected user intent is used to indicate an expected reply of a user to a response sentence, for example, indicate a type of the expected reply or content of the expected reply. The dialogue system may use an expected user intent of a previous dialogue to filter candidate user intents in a next dialogue. The expected user intent may also be referred to as an expected intent. Specifically, when the dialogue system provides a response sentence in a dialogue, the dialogue system has a specific expectation about a reply of a user, and the reply of the user to the response sentence is a response sentence of the user for an interaction device in a next dialogue. Therefore, a user intent that may be matched by the reply sentence of the user for the interaction device in the next dialogue can also be expected. In this embodiment, when inputting a response sentence corresponding to a user intent, the developer is allowed to specify a user intent that may be matched in a next dialogue. In a process of configuring a user intent, the developer may configure, for each response sentence for which a user intent in a next dialogue can be expected, one or more expected user intents corresponding to the response sentence for the user intent. The dialogue system obtains the one or more expected user intents configured for the response sentence for the user intent, and establishes and stores an association relationship between the response sentence for the user intent and the configured one or more expected user intents. After associating the response sentence with the expected user intent, when filtering candidate user intents, the dialogue system preferentially selects an expected user intent configured in a response sentence in a previous dialogue. If a candidate user intent set includes a candidate user intent meeting an expected user intent, the dialogue system preferentially returns the candidate user intent meeting the expected user intent. In addition, when sending an NLU parsing request, a service caller of the dialogue system may also specify an expected user intent that may be matched in a current round.

Optionally, the expected user intent is a context intent; or the expected user intent is an entrance intent.

Optionally, the expected user intent includes at least one of a user intent indicating a positive reply, a user intent indicating a negative reply, a user intent indicating like, and a user intent indicating dislike. For example, the user intent indicating a positive reply is a general user intent, and may correspond to a plurality of expressions in a type of utterance indicating affirmation. For example, the user intent indicating a positive reply may cover utterances such as "yes", "okay", "OK", "fine", "Hmm", and "no problem". For example, the user intent indicating a negative reply is a general user intent, and may correspond to a plurality of expressions in a type of utterance indicating negation. For example, the user intent indicating a negative reply may cover utterances such as "nope" and "no". Likewise, the user intent indicating a like reply is a general user intent, and may correspond to a plurality of expressions in a type of utterance indicating like. For example, the user intent indicating a dislike reply is a general user intent, and may correspond to a plurality of expressions in a type of utterance indicating dislike. Optionally, an intent name of the user intent indicating a positive reply is context_yes, an intent name of the user intent indicating a negative reply is context_no, an intent name of the user intent indicating a like reply is context_like, and an intent name of the user intent indicating a dislike reply is context_dislike.

Figure 8:
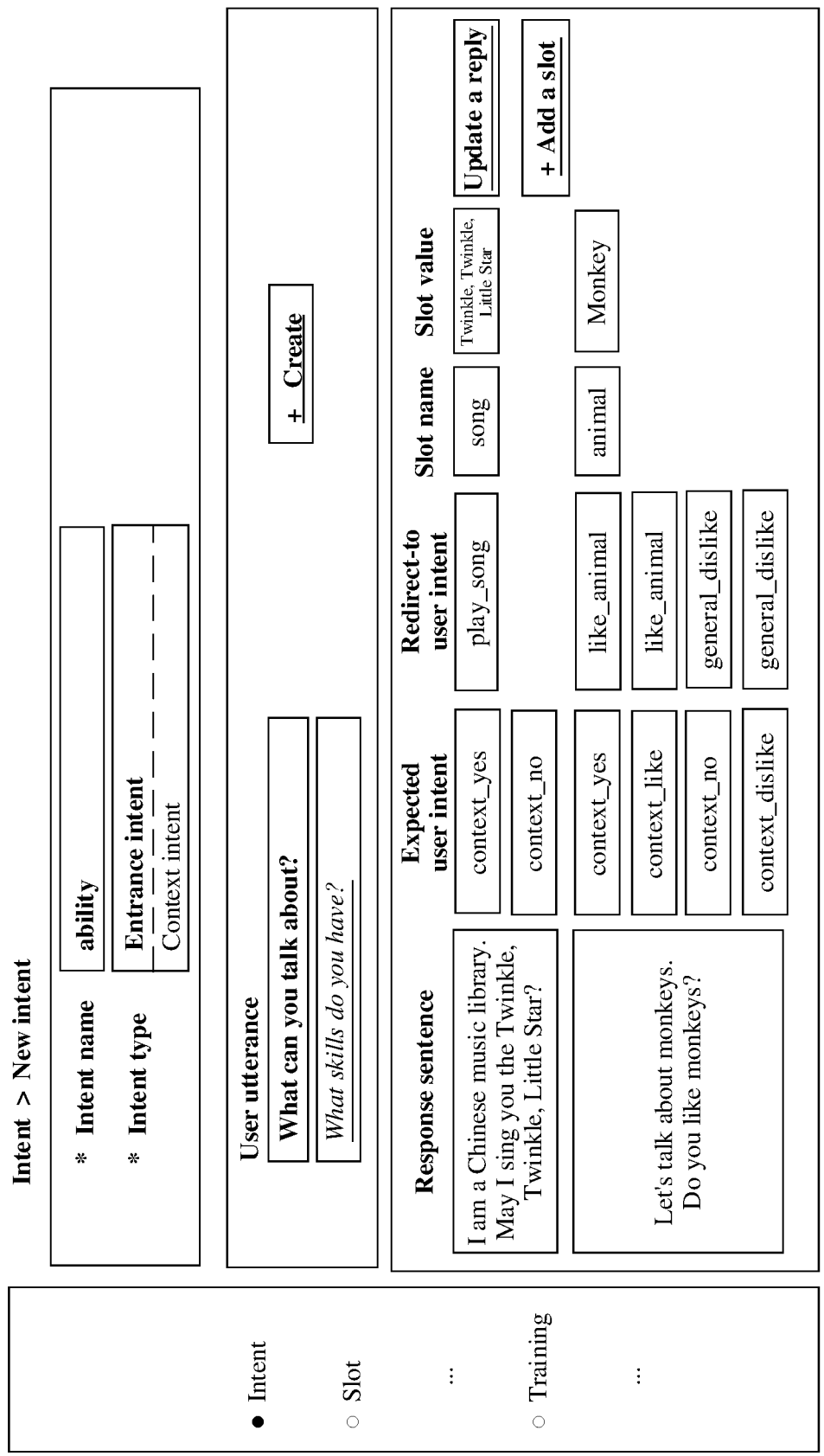
FIG. 8 is an example schematic diagram of a configuration interface of a dialogue system according to an embodiment of this application.

For example, FIG. 8 shows an example of configuring an expected user intent for a user intent ability, where the user intent ability indicates asking about a capability. The developer configures a user intent type of the user intent ability to an entrance intent. The developer configures user utterance for the user intent ability to "What can you talk about?" and "What skills do you have?". In addition, the developer configures response sentences for the user intent ability to "I am a music library. May I sing you the Twinkle, Twinkle, Little Star?" and "Let's talk about monkeys. Do you like monkeys?". In addition, the developer configures expected user intents "context_yes" and "context_no" for the response sentence "I am a music library. May I sing you the Twinkle, Twinkle, Little Star?", and configures expected user intents "context_yes", "context_no", "context_like", and "context_dislike" for the response sentence "Let's talk about monkeys. Do you like monkeys?".

In some embodiments, the dialogue system further supports automatic redirection of a user intent on a basis of supporting an expected user intent. Specifically, if an expected user intent is only an intermediate state, for example, the expected user intent is a context intent, a redirect-to user intent corresponding to the expected user intent may be used to reply to a reply sentence of a user for an interaction device and perform another task. Specifically, for a response sentence for which a redirect-to user intent needs to be used, the developer may further add a corresponding redirect-to user intent on a basis of configuring a corresponding expected user intent for the response sentence for a user intent. The redirect-to user intent may also be referred to as a redirect-to intent. For example, as shown in FIG. 8, a response sentence for the user intent ability includes "Do you like monkeys?", and the developer not only configures, for "Do you like monkeys?", an expected user intent context_yes indicating general affirmation, an expected user intent context_like indicating general like, and an expected user intent context_no indicating general negation, but also adds a corresponding redirect-to user intent like_animal for the expected user intent context_yes, adds a corresponding redirect-to user intent like_animal for the expected user intent context_like, and adds a corresponding redirect-to user intent general_dislike for the expected user intent context_no. like_animal is a user intent used to indicate liking a specific type of animal, and general_dislike is a general user intent used to indicate disliking a specific object. After the developer configures the redirect-to user intent, the dialogue system obtains one or more redirect-to user intents configured for the response sentence for the user intent, and establishes and stores an association relationship between the response sentence for the user intent, the expected user intent, and the redirect-to user intent. Optionally, the redirect-to user intent and the corresponding expected user intent have different user intent types. For example, the expected user intent is a context intent, and the redirect-to user intent is an entrance intent.

The foregoing describes the expected user intent and the redirect-to user intent. In some embodiments, when configuring a response sentence for a user intent, the developer may not only specify an expected user intent and a redirect-to user intent that may be matched in a next dialogue, but also specify and configure a keyword to be added in the next dialogue, to pass a keyword specified in a previous dialogue to the next dialogue. Specifically, in this embodiment, in a process of editing a response sentence, the developer is allowed to add a keyword to be passed to an expected user intent or a redirect-to user intent. The dialogue system obtains a keyword configured for a response sentence for a user intent, and establishes and stores an association relationship between the response sentence for the user intent, an expected user intent, and the keyword; or when an expected user intent has a redirect-to user intent, establishes and stores an association relationship between a response sentence for a user intent, the expected user intent, the redirect-to user intent, and a keyword. When using an expected user intent or a redirect-to user intent as a target user intent, the dialogue system determines a keyword corresponding to a response sentence, and performs, by using the determined keyword, slot filling on a response sentence corresponding to the expected user intent or a response sentence corresponding to the redirect-to user intent. Therefore, when returning a final result of a matched expected user intent, the dialogue system also returns a keyword configured by the developer to a user.

For example, as shown in FIG. 8, the response sentence "I am a music library. May I sing you the Twinkle, Twinkle, Little Star?" includes a slot whose slot name is song, and a keyword of the slot is "Twinkle, Twinkle, Little Star". When configuring the response sentence, the developer configures not only a redirect-to user intent play_song, but also the keyword "Twinkle, Twinkle, Little Star". In a dialogue process, slot information song: Twinkle, Twinkle, Little Star is passed to the user intent play_song.

For another example, as shown in 8, the response sentence "Let's talk about monkeys. Do you like monkeys?" includes a slot whose slot name is animal, and a keyword of the slot is "monkeys". When configuring the response sentence, the developer configures not only a redirect-to user intent like_animal, but also the keyword "monkeys". In a dialogue process, slot information animal: monkeys is passed to the user intent like_animal.

In this embodiment, an expected user intent and a redirect-to user intent and processing manners for the two types of user intents are introduced in the dialogue system, to provide a method for implementing user intent association and user intent redirection between a plurality of rounds of dialogues in the dialogue system. User intent redirection functions include rewriting an intent name, obtaining a response sentence for a target user intent, adding a specified slot, and the like. In this embodiment, a user is supported in specifying, in a user intent reply module of the dialogue system, an expected user intent in a next dialogue and a redirect-to user intent that may correspond to the expected user intent. An expected user intent and a redirect-to user intent can help the developer easily control a process of a plurality of rounds of dialogues in the dialogue system, implement automatic topic redirection, and reuse a reply template that is for another user intent and that has been input.

S34: The dialogue system receives an association relationship, configured by the developer on the interface, between an entrance intent and a context intent.

The developer may configure a corresponding context intent for an entrance intent, and the dialogue system establishes an association relationship between the entrance intent and the context intent. Optionally, one entrance intent is associated with a plurality of context intents, and the association may be specifically implemented by using logic of an expected user intent. In addition, when configuring an associating user intent, the developer may add a keyword that needs to be passed, to implement user intent association and slot succession between a context intent and an entrance intent.

Figure 9:
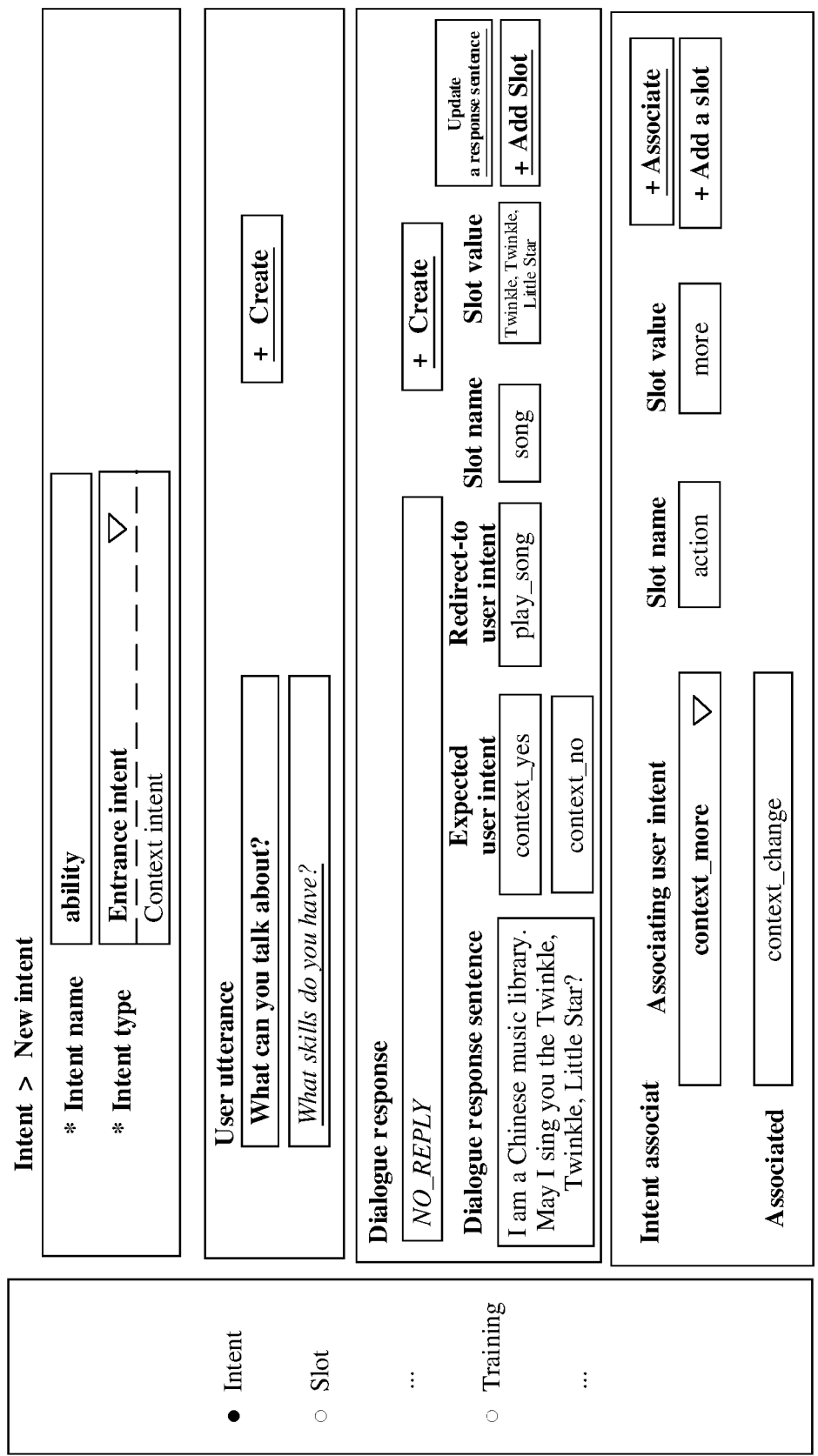
FIG. 9 is an example schematic diagram of a configuration interface of a dialogue system according to an embodiment of this application.

As shown in FIG. 9, the developer has previously input a context intent context_more. context_more indicates asking about more context intents, and context_more covers user utterances such as "Anything else?" and "What else?". On an interface of the entrance intent ability, the developer may configure an associating user intent of the entrance intent ability to the context intent context_more. The dialogue system receives and stores an association relationship between the entrance intent ability and context intent context_more, to associate the context intent context_more with the entrance intent ability. In addition, if a specific keyword needs to be added to the associating user intent, the developer may also configure a keyword on the interface. For example, as shown in FIG. 9, a slot is added to the associating user intent, where a slot name is action, and a keyword is more. In this case, the dialogue system receives and stores an association relationship between the context intent context_more and the keyword more. After the configuration, in a human-computer dialogue process, when the context intent context_more is matched, the dialogue system may find the associating user intent ability of the user intent context_more, to reply with reference to information associated with the entrance intent ability. In addition, the dialogue system further finds the keyword more associated with the user intent context_more, and returns the keyword more to a user along with the user intent context_more.

How to store an association relationship between an entrance intent and a context intent includes a plurality of implementations. In a possible implementation, after completing user intent association, the dialogue system stores an association relationship between an entrance intent and a context intent in a user intent association table. Optionally, in the user intent association table, an associated user intent is a key, and an associating user intent is a value. For example, the user intent ability is a key, and the user intent context_more is a value.

According to the method provided in this embodiment, a corresponding expected user intent and a corresponding redirect-to user intent are configured for a response sentence for each user intent, thereby helping associate a user intent in a previous dialogue with a user intent in a next dialogue, and helping the dialogue system to determine the user intent in the next dialogue by using an expected user intent and a redirect-to user intent. In addition, a slot name and a keyword are configured for a response sentence for each user intent, thereby helping pass slot information associated with a previous dialogue to a next dialogue for use, and helping the dialogue system automatically complement missing information in the next dialogue. In addition, a context intent is defined for an incomplete expression, so that the developer can input one context intent for a same type of incomplete expression without defining different user intents for user utterances that are repeatedly input, thereby reducing configuration complexity.

The method 300 describes a process of configuring various user intents, slot data, and various user utterances in the dialogue system. The following describes a training process for an intent recognition model and a slot extraction model by using a method 400. In other words, the method 400 describes a method process about how a dialogue system trains an intent recognition model and a slot extraction model based on data input by a developer.

Figure 10:
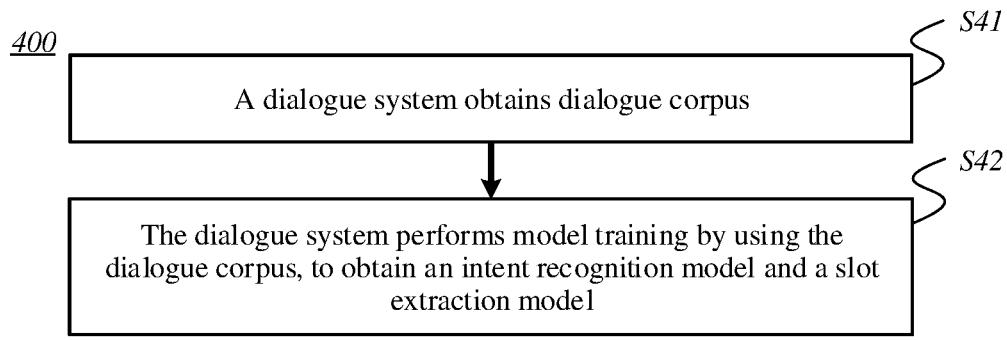
FIG. 10 is an example flowchart of a model training method for a human-computer dialogue according to an embodiment of this application.

FIG. 10 is a flowchart of a model training method 400 for a human-computer dialogue according to an embodiment of this application.

Optionally, the method 400 is performed by the server 105 in the system architecture 100, and sample data in the method 400 may be sent by the data input device 103 to the server 105. Optionally, the method 400 is performed by the model training module 202 in the system architecture 200. Optionally, the method 400 is performed by a CPU, or may be performed jointly by a CPU and a graphics processing unit (GPU for short); or a GPU may not be used, but another processor suitable for neural network computing is used. This is not limited in this application. For example, the CPU is configured to perform processing work corresponding to S41, and the GPU is configured to perform processing work corresponding to S42.

For example, the method 400 includes S41 and S42.

S41: A dialogue system obtains dialogue corpus.

The dialogue corpus includes a plurality of samples, and each sample includes a user intent and at least one user utterance expressing the intent. For example, a preconfigured entrance intent and each user utterance corresponding to the entrance intent are combined into a sample, and a preconfigured context intent and each user utterance corresponding to the context intent are combined into a sample. For example, a sample 1 includes an entrance intent get_weather_entrance, a user utterance "Will it rain in Shenzhen today?", and a user utterance "How is the weather in Beijing today?"; and a sample 2 includes a context intent context_spots, a user utterance "What scenic spots are there?", and a user utterance "What is fun there?".

S42: The dialogue system performs model training by using the dialogue corpus, to obtain an intent recognition model and a slot extraction model.

In a model training process, the dialogue system may use a user utterance as an input parameter of the intent recognition model, and use an intent name of a user intent corresponding to the user utterance as an output parameter of the intent recognition model.

The intent recognition model includes but is not limited to a user intent classification model or a user intent matching model. The user intent classification model is used to predict, based on a sentence input by each user, a user intent corresponding to a reply sentence of the user for an interaction device. The dialogue system may perform model training by using a machine learning algorithm, to obtain the user intent classification model. The machine learning algorithm includes but is not limited to a support vector machine algorithm, a logistic regression algorithm, a deep neural network algorithm, and the like. In a process of training the user intent classification model, the dialogue system may use user utterance data input by the developer as a positive sample, and randomly sample some other dialogue corpus data as a negative sample. In a process of training the user intent matching model, the dialogue system may establish an index for user utterance data input by the developer, obtain a plurality of candidate user intents through searching, and then obtain a most likely matching result through further sorting. More semantic features may be used in a sorting algorithm, and some neural network-based deep sorting models may be selected as a sorting model. In the case of a small data volume, the sorting model may be alternatively used to directly sort all candidate user intents, thereby eliminating a first step of searching.

The slot extraction model is used to extract, based on a sentence input by a user, a slot and a keyword in the user sentence. For example, the slot extraction model is a sequence labeling model. The sequence labeling model includes but is not limited to a conditional random field (CRF) model and related variants of a long short-term memory (LSTM) network.

According to the method provided in this embodiment, the intent recognition model is trained by using the dialogue corpus, and the intent recognition model can learn a mapping relationship between a user utterance and a user intent by using the dialogue corpus in a model training process. Therefore, in a process of a human-computer dialogue, the dialogue system can predict, by using the intent recognition model, an accurate candidate user intent based on a sentence input by a user.

The method 400 describes a model training process. The following describes an example of a process of reply generation in a human-computer dialogue by using a method 410. In other words, the method 410 describes a method process about how a dialogue system generates a response sentence by using the configuration by the developer in the method 300, dialogue history, and the intent recognition model trained in the method 400, when receiving a reply sentence of a user for an interaction device. It should be understood that, for features of the method 410 that are similar to those of the method 300 and the method 400, reference may be made to the method 300 and the method 400.

For ease of understanding, the following describes an example application scenario of the method 410.

In a dialogue, a user says "okay", and the dialogue system finds, from dialogue history, that a machine says "May I sing you the Twinkle, Twinkle, Little Star?", to determine that an expected intent of the user in a current round is about whether the machine is to sing the Twinkle, Twinkle, Little Star. The dialogue system may find, based on expected intents "yes" and "no" associated with "May I sing you the Twinkle, Twinkle, Little Star?", that a target expected user intent matching the expected intents is "yes", and therefore play the song Twinkle, Twinkle, Little Star based on "sing the Twinkle, Twinkle, Little Star" and "yes", to respond to "okay".

Figure 11:
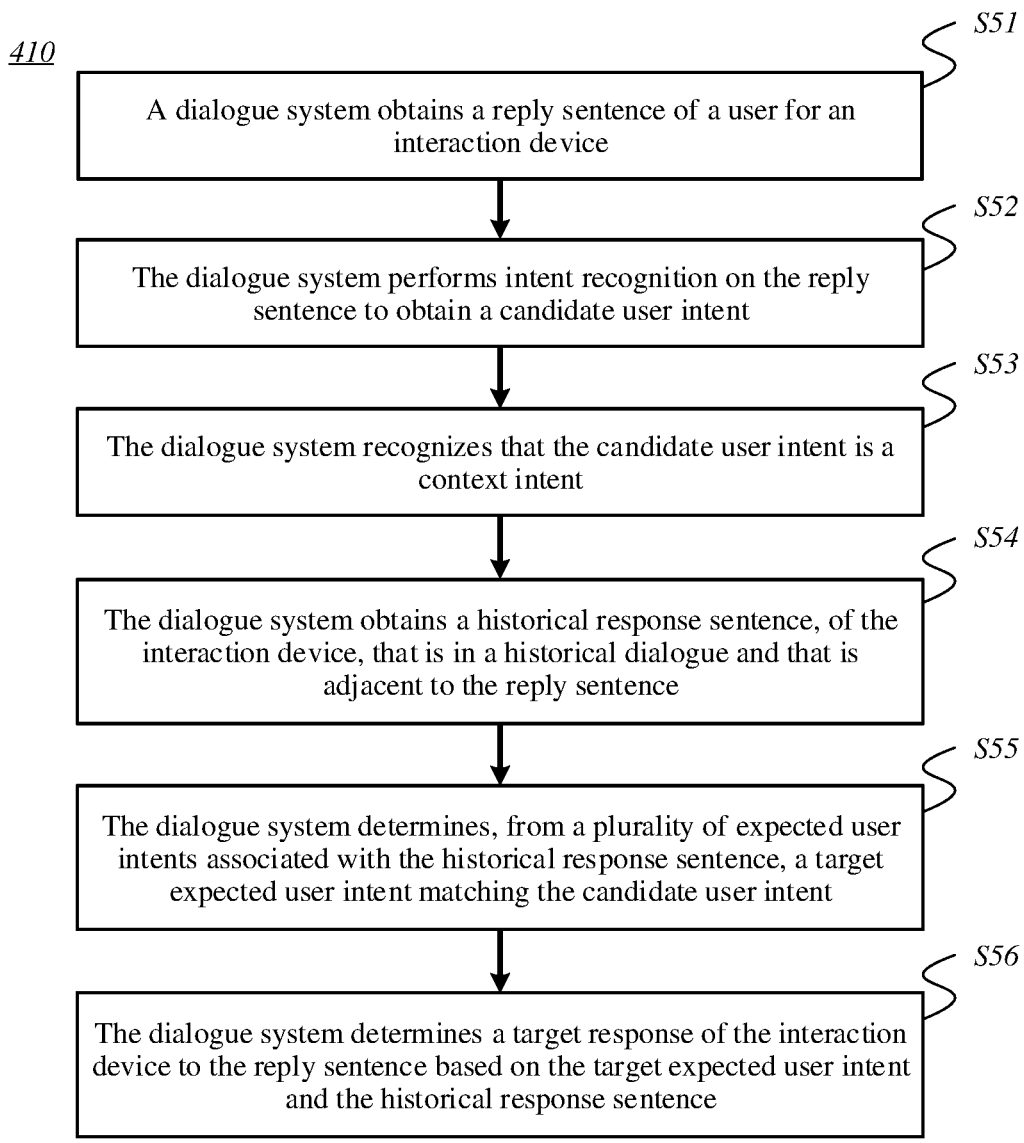
FIG. 11 is an example flowchart of a response method in a human-computer dialogue according to an embodiment of this application.

FIG. 11 is a flowchart of a response method 410 in a human-computer dialogue according to an embodiment of this application. For a process of the method 410, refer to flowcharts shown in FIG. 13, FIG. 14A and FIG. 14B, and FIG. 16A and FIG. 16B.

The method 410 may be specifically performed by the server 105 in the system architecture 100, and a reply sentence of a user for an interaction device in a dialogue in the method 410 may be input data provided by the client access device 104 in the system architecture 100. Optionally, the method 410 may be performed by a CPU, or may be performed jointly by a CPU and a GPU; or a GPU may not be used, but another processor suitable for neural network computing is used. This is not limited in this application.

For example, the method 410 includes S51 to S56.

S51: A dialogue system obtains a reply sentence of a user for an interaction device.

For example, the interaction device is the client access device 104. For example, the interaction device is a terminal. For example, the interaction device is a mobile phone on which a voice assistant is run, or a smart speaker. For example, the reply sentence is a sentence input by the user in a current dialogue, that is, the words said by the user. Specifically, in a process of a human-computer dialogue, the user 102 inputs, on the client access device 104, the reply sentence of the user for the interaction device in the current dialogue through voice or typing. The client access device 104 generates, based on the reply sentence of the user for the interaction device, a request packet for requesting a human-computer dialogue, and sends the request packet to the dialogue system. The dialogue system receives the request packet, obtains the reply sentence of the user for the interaction device from the request packet, preprocesses the reply sentence, and then performs a subsequent process on a preprocessed reply sentence. The sentence input by the user in the dialogue is also referred to as a query of the user.

Optionally, the dialogue system preprocesses the reply sentence. How to preprocess the reply sentence of the user for the interaction device includes a plurality of implementations. In a possible implementation, in a scenario in which an expected user intent in the current dialogue is specified in the request packet, the dialogue system extracts and stores the expected user intent or a redirect-to user intent. In addition, in a scenario in which a slot to be supplemented in the current dialogue is specified in the request packet, the dialogue system extracts a keyword from the request packet, and stores the keyword carried in the request packet. Specifically, because prediction by the dialogue system on the user query (namely, the reply sentence of the user for the interaction device) is uncertain, assuming that scores of two candidate user intents predicted based on the reply sentence of the user for the interaction device are similar, if the dialogue system selects a target user intent only based on the scores of the candidate user intents and then determines a response sentence based on the target user intent, a returned response sentence may not be a response sentence finally expected by the user. In view of this, in this embodiment, the user is allowed to specify an expected user intent, and the specified expected user intent is used for reference when the dialogue system filters candidate user intents.

How to allow the user to specify an expected user intent includes a plurality of implementations. Optionally, when the user specifies an expected user intent, the client access device 104 adds an expected user intent parameter to a request packet. After receiving the request packet, the dialogue system determines whether the request packet includes the expected user intent parameter. If the request packet includes the expected user intent parameter, the dialogue system parses the expected user intent and extracts the parameter. How to add the expected user intent parameter includes a plurality of implementations. For example, a uniform resource locator (URL) parameter or a request body of the request packet carries a field whose field name is expect, and the field expect includes the expected user intent parameter. A data form of the expected user intent parameter may be a string, and the expected user intent parameter may be referred to as an expect string For example, the expect string in the request packet is context_yes>>play_song (song: Twinkle, Twinkle, Little Star), and the expect string includes an expected user intent (context_yes), a redirect-to user intent (play_song), and a to-be-supplemented slot (song: Twinkle, Twinkle, Little Star). The dialogue system parses out the expected user intent context_yes and the redirect-to user intent play_song from the expect string. A keyword that needs to be supplemented to a final result to be returned is song: Twinkle, Twinkle, Little Star. The dialogue system stores the parsed-out expected user intent to an expected user intent set, stores the parsed-out redirect-to user intent to a redirect-to user intent table, and stores the parsed-out keyword to a slot table, to subsequently determine a response sentence based on the expected user intent and the redirect-to user intent, and supplement the keyword to the final result to be returned.

S52: The dialogue system performs intent recognition on the reply sentence to obtain a candidate user intent.

In a possible implementation, the dialogue system inputs the reply sentence input by the user to the intent recognition model trained in the method 400, performs intent recognition on the reply sentence by using the intent recognition model, and outputs a candidate user intent set (candidate Intent) and a score (score) of each candidate user intent in the candidate user intent set, to implement preliminary selection of a result.

For example, the reply sentence input by the user is "okay". After "okay" is input to the intent recognition model, the intent recognition model outputs three candidate user intents: a user intent general_yes, a user intent context_yes, and a user intent confirm_yes. The user intent general_yes is a general user intent indicating affirmation, a score of the user intent general_yes is 1.0, a score of the user intent context_yes is 1.0, and a score of the user intent confirm_yes is 1.0. In this example, the scores of the three candidate user intents are all 1.0, and it is difficult to determine an appropriate user intent based on the scores. However, subsequent steps help accurately find the target user intent.

In addition, the dialogue system further performs slot extraction on the reply sentences of the user for the interaction device. For example, the dialogue system inputs the reply sentence input by the user to the slot extraction model trained in S42, performs slot extraction on the reply sentence by using the slot extraction model, and outputs a slot and a keyword in the reply sentence. For example, the reply sentence of the user for the interaction device is "How is the weather in Beijing tomorrow?", and a slot and a keyword that are extracted by the dialogue system from "How is the weather in Beijing tomorrow?" are "time: tomorrow" and "location: Beijing".

Optionally, the dialogue system filters a candidate user intent when a specific condition is met. An implementation 1 to an implementation 3 are used as examples for description below.

Implementation 1: The dialogue system determines whether an expected user intent is specified in a dialogue request of the user in the current round. If an expected user intent is specified and an intent name of the specified expected user intent is the same as an intent name of a candidate user intent, the dialogue system adds the candidate user intent to a final candidate user intent set. For example, if a type of the candidate user intent is a context intent, the dialogue system determines whether the packet carrying the reply sentence includes an expected user intent parameter; and if the packet includes an expected user intent parameter and an intent name in the expected user intent parameter is the same as the name of the candidate intent, the dialogue system retains the candidate user intent; or if the packet does not include an expected user intent parameter, the dialogue system filters out the candidate user intent. For example, a candidate user intent predicted by a model includes a context intent context_yes, and context_yes appears in the expect string of the dialogue request of the user in the current round. In this case, the dialogue system adds the context intent context_yes to the final candidate user intent set.

Implementation 2: If a type of a candidate user intent is a context intent, the dialogue system determines whether a response sentence of the dialogue system in a previous dialogue has an associated expected user intent; and if the response sentence has an associated expected user intent and an intent name of the expected user intent associated with the response sentence is the same as an intent name of the candidate user intent, the dialogue system adds the candidate user intent to a final candidate user intent set; or if the response sentence is not associated with an expected user intent, the dialogue system filters out the candidate user intent.

Implementation 3: If a type of a candidate user intent is a context intent, the dialogue system determines whether the candidate user intent has an associated common named entity; and if the candidate user intent has an associated common named entity and a value of the common named entity exists, the dialogue system adds the candidate user intent to a final candidate user intent set; or if the candidate user intent is not associated with a common named entity, the dialogue system filters out the candidate user intent. The dialogue system may determine, based on configuration information, a slot name referenced by the common named entity associated with the candidate user intent; determine whether a keyword corresponding to the slot name is empty; and if the keyword corresponding to the slot name is not empty, determine that the value of the common named entity exists.

For example, as shown in FIG. 7, a candidate user intent obtained by the dialogue system is context_spots, where context_spots is a context intent indicating a location, and the dialogue system may determine whether enabling of use of a common named entity is configured for the user intent context_spots. For example, the dialogue system determines, based on configuration information, that the user intent context_spots is configured to use a common named entity, and a slot referenced by the common named entity is global_place. If a common named entity extracted by the dialogue system from a historical dialogue is global_place: Beijing, the dialogue system adds the user intent context_spots to the final candidate user intent set.

S53: The dialogue system recognizes that the candidate user intent is a context intent.

Specifically, the dialogue system obtains a type of the candidate user intent; the dialogue system determines whether the type of the candidate user intent is an entrance intent or a context intent; and if the type of the candidate user intent is a context intent and the dialogue system recognizes that required information is missing in the candidate user intent, the dialogue system performs the following step.

S54: The dialogue system obtains a historical response sentence, of the interaction device, that is in a historical dialogue and that is adjacent to the reply sentence.

For example, the response sentence that is in the historical dialogue and that is adjacent to the reply sentence is a response sentence of the interaction device in a previous dialogue, namely, words said by the machine in the previous dialogue. For example, the reply sentence input by the user is "okay", and the historical response sentence, of the interaction device, that is adjacent to the reply sentence is "I am a music library. May I sing you the Twinkle, Twinkle, Little Star?".

Optionally, when the previous dialogue ends, the dialogue system prestores, in an expected user intent table, each expected user intent associated with the response sentence in the previous dialogue, where the expected user intent table includes one or more expected user intents associated with the response sentence. The dialogue system queries the expected user intent table and determines whether a candidate user intent matches an expected user intent in the expected user intent table. The dialogue system selects a candidate user intent matching an expected user intent from the candidate user intent set, and returns the selected candidate user intent as a new candidate user intent. How to determine whether a candidate user intent matches an expected user intent includes a plurality of manners. For example, if a candidate user intent and an expected user intent have a same intent name, the dialogue system determines that the candidate user intent matches the expected user intent.

Optionally, the expected user intent table includes a plurality of expected user intents, and the dialogue system processes each expected user intent in the expected user intent table one by one in a preset order. If an expected user intent in the expected user intent table has a same intent name as that of a candidate user intent, the dialogue system adds the candidate user intent to a new candidate user intent set, and returns the new candidate user intent set. If the expected user intent table does not have a candidate user intent that meets an expected user intent, the dialogue system returns the complete candidate user intent set. For example, if the expected user intent table includes an expected user intent context_yes, and the expected user intent context_yes has a same intent name as that of a candidate user intent context_yes, the dialogue system constructs a new candidate user intent set that includes only the user intent context_yes, and returns the new candidate user intent set. Optionally, the preset order of processing the expected user intent table by the dialogue system is that an expected user intent ranked first in the expected user intent table is preferentially processed. In this case, the dialogue system selects, from the candidate user intent set, the first candidate user intent matching an expected user intent as the target user intent.

An expected user intent is used to indicate a category of an expected relay of the user to a historical response sentence. Optionally, a process of determining an expected user intent may be suitable for a scenario of asking about an opinion, a scenario of resource recommendation, or a scenario of initiating a new topic. Specifically, in the scenario of asking about an opinion, the dialogue system asks a question by using a response sentence, to ask about an opinion of the user, and the dialogue system has a specific expectation about an opinion in an answer by the user (that is, the reply sentence of the user for the interaction device in the current dialogue). For example, the response sentence of the dialogue system in the previous dialogue is "Do you like monkeys?". In this example, the dialogue system may expect a reply of the user to be either an utterance similar to liking monkeys or an utterance similar to disliking monkeys. Therefore, the dialogue system may use a user intent indicating a positive reply, a user intent indicating a negative reply, a user intent indicating like, and a user intent indicating dislike as expected user intents. For another example, in the scenario of resource recommendation, the dialogue system performs recommendation by using a response sentence, to recommend a resource to the user. For example, the resource is a service, a commodity, a song, a dance, or a video. In this scenario, the dialogue system has a specific expectation about whether the user is to accept the recommendation (that is, the reply sentence of the user for the interaction device in the current dialogue). For example, the resource is a song, and the response sentence of the dialogue system in the previous dialogue is "May I sing you the Twinkle, Twinkle, Little Star?". In this example, the dialogue system may expect a reply of the user to be either an utterance similar to asking the dialogue system to sing a song or an utterance similar to asking the dialogue system not to sing a song. Therefore, the dialogue system may use a user intent indicating a positive reply and a user intent indicating a negative reply as expected user intents.

Optionally, the dialogue system filters the candidate user intent set. For example, after updating the candidate user intent set based on S54, the dialogue system selects, based on the score of each candidate user intent in the candidate user intent set, a candidate user intent with a highest score from the candidate user intent set obtained in S54 as the target user intent. For example, the candidate user intent set includes a user intent general_yes, a user intent context_yes, and a user intent confirm_yes, and the user intent context_yes has a highest score. In this case, the dialogue system returns the user intent context_yes.

For example, as shown in FIG. 8, after configuration is performed by using the method shown in FIG. 8, if a reply sentence of the user for the interaction device in the previous dialogue is "What skills do you have?", the dialogue system may return the response sentence "I am a music library. May I sing you the Twinkle, Twinkle, Little Star?", and determine that expected user intents are "context_yes" and "context_no". In the current dialogue, if the reply sentence of the user for the interaction device is "okay", the candidate user intent set predicted by the dialogue system based on the reply sentence of the user for the interaction device includes the user intent "context_yes". Because the user intent "context_yes" is an expected user intent, the dialogue system preferentially matches the user intent "context_yes".

S55: The dialogue system determines, from a plurality of expected user intents associated with the historical response sentence, a target expected user intent matching the candidate user intent.

The target expected user intent is an expected user intent, and the target expected user intent matches the candidate user intent. Optionally, the dialogue system determines, from the plurality of expected user intents associated with the historical response sentence, an expected user intent the same as the candidate user intent as the target expected user intent. For example, the historical response sentence is associated with two expected user intents: "yes" and "no", and the candidate user intent is "yes". In this case, the target expected user intent is "yes".

S56: The dialogue system determines a target response of the interaction device to the reply sentence based on the target expected user intent and the historical response sentence.

Optionally, the target response is outputting a response sentence, and the determining a target response includes: determining a target response sentence of the interaction device for the reply sentence, and outputting the target response sentence. The target response sentence is a response sentence of the interaction device in the current dialogue. Optionally, the target response is executing an instruction corresponding to the target expected user intent and the historical response sentence, and the determining a target response includes: determining the instruction corresponding to the target expected user intent and the historical response sentence, and executing the instruction corresponding to the target expected user intent and the historical response sentence.

Optionally, the dialogue system determines a redirect-to user intent based on the historical response sentence and the target expected user intent; determines, based on the redirect-to user intent, an instruction corresponding to the redirect-to user intent; and executes the instruction corresponding to the redirect-to user intent. The redirect-to user intent is an explicit user intent. For example, the redirect-to user intent indicates an operation or an instruction that the user expects the interaction device to perform. For example, based on that the historical response sentence is "May I sing you the Twinkle, Twinkle, Little Star?" and the target expected user intent is "yes", it is determined that the redirect-to user intent is "play the song". The dialogue system may determine, based on a correspondence between the "play the song" and an instruction, a play instruction corresponding to "play the song", and execute the play instruction.

Optionally, if a candidate user intent matches an expected user intent, the dialogue system determines whether the expected user intent has a corresponding redirect-to user intent, and if the expected user intent has a corresponding redirect-to user intent, the dialogue system updates the target user intent from the expected user intent to the redirect-to user intent, to implements direction between user intents.

In some embodiments, an expected user intent and a corresponding redirect-to user intent have different intent names. In a process of redirection between user intents, the dialogue system rewrites an intent name. The rewriting an intent name means updating an intent name of the target user intent. When a matched expected user intent has a corresponding redirect-to user intent, the dialogue system updates the intent name of the target user intent from an intent name of the expected user intent to an intent name of the redirect-to user intent.

In some embodiments, a redirect-to user intent and an expected user intent corresponding to the redirect-to user intent correspond to different response sentences. In a process of redirection between user intents, the dialogue system replaces a response sentence. The replacing a response sentence means updating the response sentence.

Specifically, if a matched expected user intent has a corresponding redirect-to user intent, the dialogue system updates a response sentence from a response sentence corresponding to the expected user intent to a response sentence corresponding to the redirect-to user intent, to reply by using the response sentence for the redirect-to user intent.

Optionally, a redirect-to user intent and an expected user intent correspond to different topics. For example, a response sentence corresponding to the expected user intent represents a topic A, and a response sentence corresponding to the redirect-to user intent represents a topic B. Topic redirection can be implemented by updating a response sentence from a response sentence corresponding to the expected user intent to a response sentence corresponding to the redirect-to user intent.

For example, the response sentence in the previous dialogue is "Do you want me to play a song?". An expected user intent for the response sentence includes a user intent context_yes indicating a positive reply. However, a user intent that is really useful for the dialogue system is a user intent "play_song" indicating to play a song. In this case, a developer may preconfigure a corresponding redirect-to user intent "play_song" for the expected user intent "context_yes". In a process of a human-computer dialogue, if a candidate user intent matches the expected user intent context_yes and the user intent context_yes has a highest score, when the target user intent is the user intent context_yes, the dialogue system queries the redirect-to user intent table, and determines that the user intent context_yes has a corresponding redirect-to user intent play_song. In this case, the dialogue system rewrites the intent name of the target user intent from context_yes to play_song, replaces a response sentence for the target user intent from a response sentence corresponding to the user intent context_yes with a response sentence corresponding to the user intent play_song, and replies by using the response sentence corresponding to "play_song".

By associating an expected user intent of a response sentence with a redirect-to user intent, the dialogue system rewrites the target user intent from the expected user intent to the redirect-to user intent when a candidate user intent matches the expected user intent, thereby supporting automatic redirection between user intents. When an expected user intent is a context intent and a redirect-to user intent is an entrance intent, a user intent is more explicit after user intent redirection is performed. Therefore, accuracy of a response sentence is improved when a redirect-to user intent is used for a reply in a dialogue, thereby making a human-computer dialogue more coherent.

With reference to the foregoing steps, if a candidate user intent matches an expected user intent and the matched expected user intent has a corresponding redirect-to user intent, the target user intent may be a redirect-to user intent. In this case, the dialogue system determines, from at least one redirect-to user intent associated with the response sentence, a target redirect-to user intent corresponding to the expected user intent. The target redirect-to user intent may also be referred to as a target redirect-to intent. The dialogue system determines a response sentence from at least one response sentence corresponding to the target redirect-to user intent. The target redirect-to user intent is a redirect-to user intent that has a correspondence with the expected user intent in all redirect-to user intents associated with the response sentence, and each of the at least one redirect-to user intent has an intent name different from that of the expected user intent. For example, a candidate user intent matches an expected user intent context_yes, and a redirect-to user intent corresponding to the user intent context_yes is a user intent play_song. In this case, the target redirect-to user intent is the user intent play_song, and the dialogue system selects a response sentence "I will play this song for you.".

Optionally, the dialogue system further processes an expected user intent and a redirect-to user intent in a next dialogue.

If an expected user intent is configured in the response sentence for the target user intent, the dialogue system updates the expected user intent table, and updates an expected user intent associated with a response sentence in the expected user intent table to the expected user intent associated with the response sentence for the target user intent, to update an expected user intent in the previous dialogue to an expected user intent in the current dialogue. If an associating user intent is configured for the target user intent, the dialogue system also updates the expected user intent table. If the expected user intent configured for the target user intent has a corresponding redirect-to user intent, the dialogue system also updates the redirect-to user intent table. If there is a keyword that needs to be passed to the next dialogue in the associating user intent and the expected user intent configured for the target user intent, the dialogue system adds the keyword to the slot table.

For example, if a selected response sentence is used for recommending a story, for example, the response sentence is "I learned a new story today: the Little Red Riding Hood. May I tell you the story?", and the response sentence is associated with an expected user intent context_yes, a redirect-to user intent play_story, and a keyword (story: Little Red Riding Hood) that needs to be passed to the next dialogue, the dialogue system stores the expected user intent context_yes to the expected user intent table, stores the redirect-to user intent (context_yes, play_story) to the redirect-to user intent table, and stores the keyword (story: Little Red Riding Hood) to the slot table.

The expected user intent in the next dialogue is processed, so that the expected user intent in the current dialogue can be used when a response sentence is generated in the next dialogue. For example, when user intent parsing is performed on a query in the next dialogue, the expected user intent in the current dialogue may be preferentially selected and processed. The redirect-to user intent in the next dialogue is processed, so that the redirect-to user intent corresponding to the expected user intent in the current dialogue can be used when a response sentence is generated in the next dialogue. The keyword in the response sentence is added to the slot table, so that the keyword in the current dialogue can be passed to the next dialogue for use. For example, slot filling is performed on the response sentence in the next dialogue by using the keyword.

Optionally, the dialogue system further updates a common named entity. Specifically, the dialogue system performs named entity recognition on at least one of the reply sentence of the user for the interaction device or the response sentence in the current dialogue, and updates an extracted named entity to a common named entity set. The named entity recognition may be implemented by an entity recognition model. For example, the entity recognition model is implemented by a CRF and a deep learning algorithm. For example, the reply sentence of the user for the interaction device in the current dialogue is "okay", and the response sentence of the dialogue system is "I will play this song for you.". In this example, the dialogue system does not extract a related common named entity. For another example, the reply sentence of the user for the interaction device in the current dialogue is "Will it rain in Shenzhen today?", and the dialogue system extracts, by using a named entity recognition algorithm, global_place Shenzhen from the reply sentence of the user for the interaction device, and updates Shenzhen to the common named entity set. The common named entity set is introduced and processed in the dialogue system, and the dialogue system extracts a common named entity from each dialogue and places the common named entity into the common named entity set, so that a common named entity in a historical dialogue can be provided for the dialogue system, thereby implementing automatic slot complementation for user intents corresponding to some coreference expressions or omission expressions, and implementing slot sharing across user intents.

In the method provided in this embodiment, a response sentence initiated by the interaction device is associated with an expected user intent. When the user initiates a dialogue, in a process of selecting a user intent from candidate user intents of the current dialogue, a dialogue system preferentially selects a target expected user intent matching a historical response sentence, and the dialogue system determines a response sentence by using the target expected user intent. Because processing logic for an expected user intent is introduced and an expected user intent of a historical dialogue is passed to the current dialogue for use, the historical dialogue and the current dialogue are associated in terms of the user intent, thereby improving accuracy of a response sentence generated by the dialogue system, helping improve a context cohesion capability of the dialogue system, and improving coherence of a human-computer dialogue.

For ease of understanding, an example application scenario of the following method 420 is described.

In a dialogue, a user says "How is the weather?", and a dialogue system finds, in dialogue history, that a machine says "Then what about Beijing?" in a previous dialogue, and therefore determines that an expected intent of the user in the current round is "Beijing+weather", "Beijing+tourism information", or "Beijing+news". In this case, a target expected user intent obtained through matching based on "weather" is "Beijing+weather", so that a response sentence of the machine is constructed based on "Beijing+weather".

Figure 12:
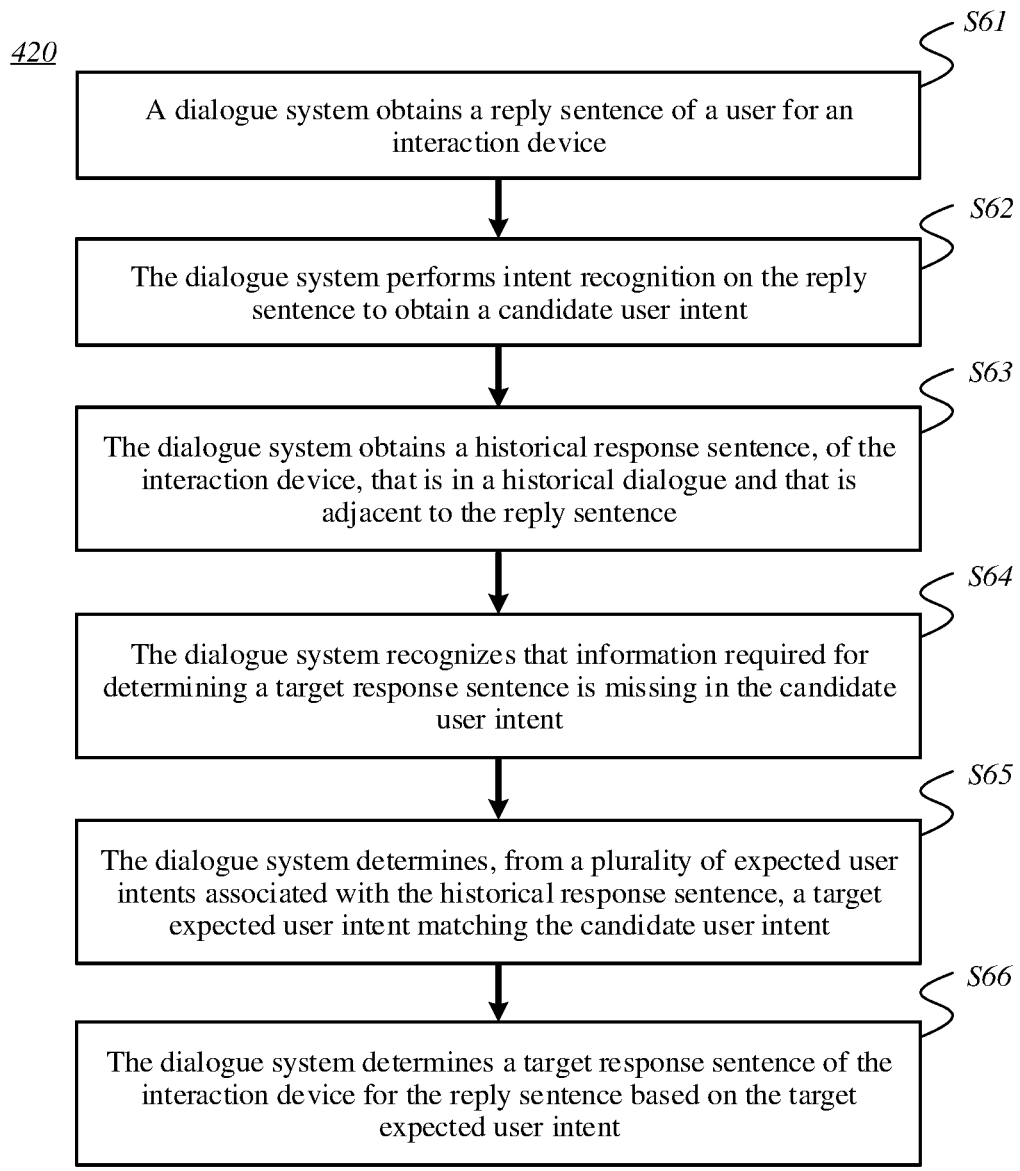
FIG. 12 is an example flowchart of a response method in a human-computer dialogue according to an embodiment of this application.
Figure 13:
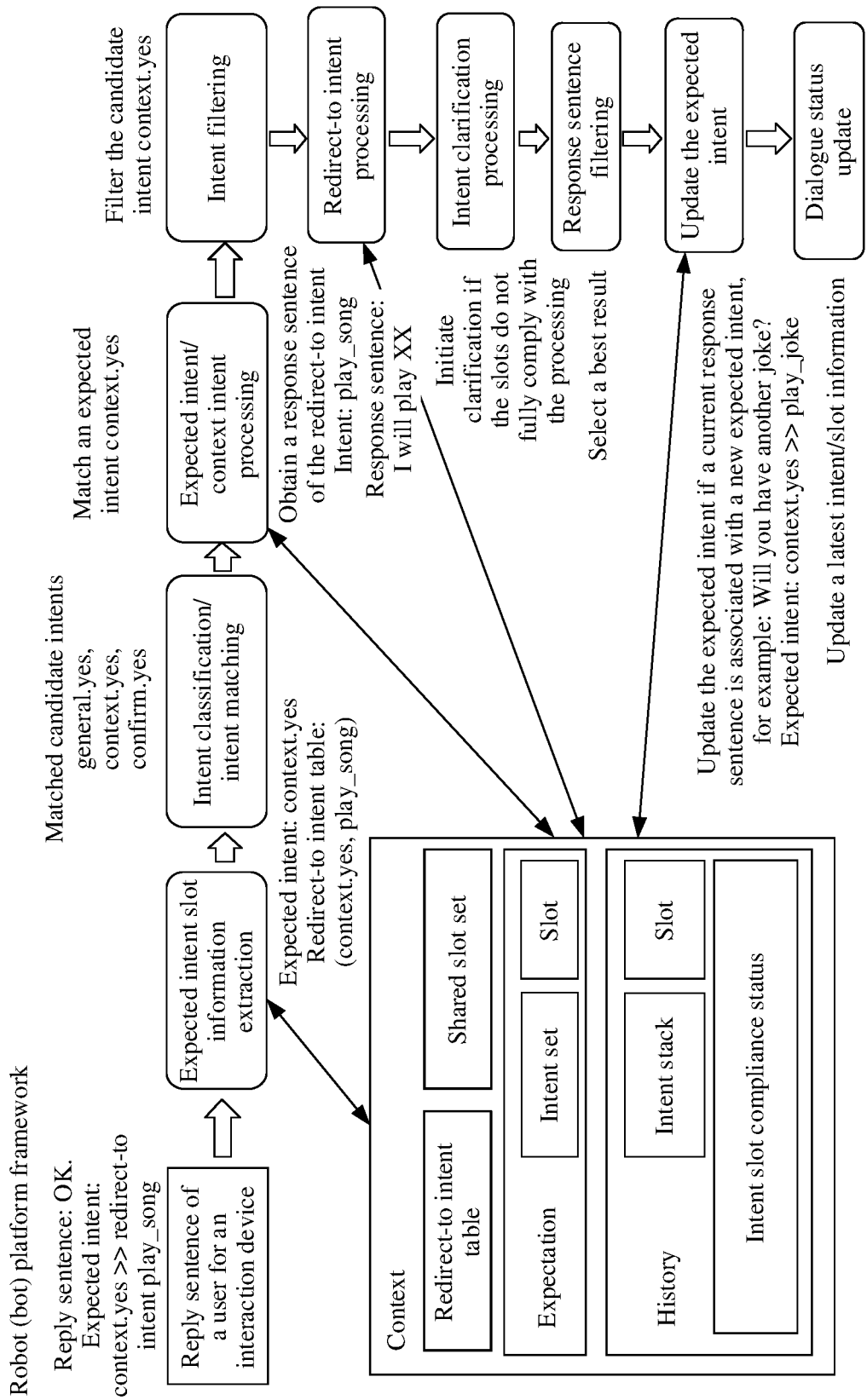
FIG. 13 is an example flowchart of a response method in a human-computer dialogue according to an embodiment of this application.
Figure 14A:
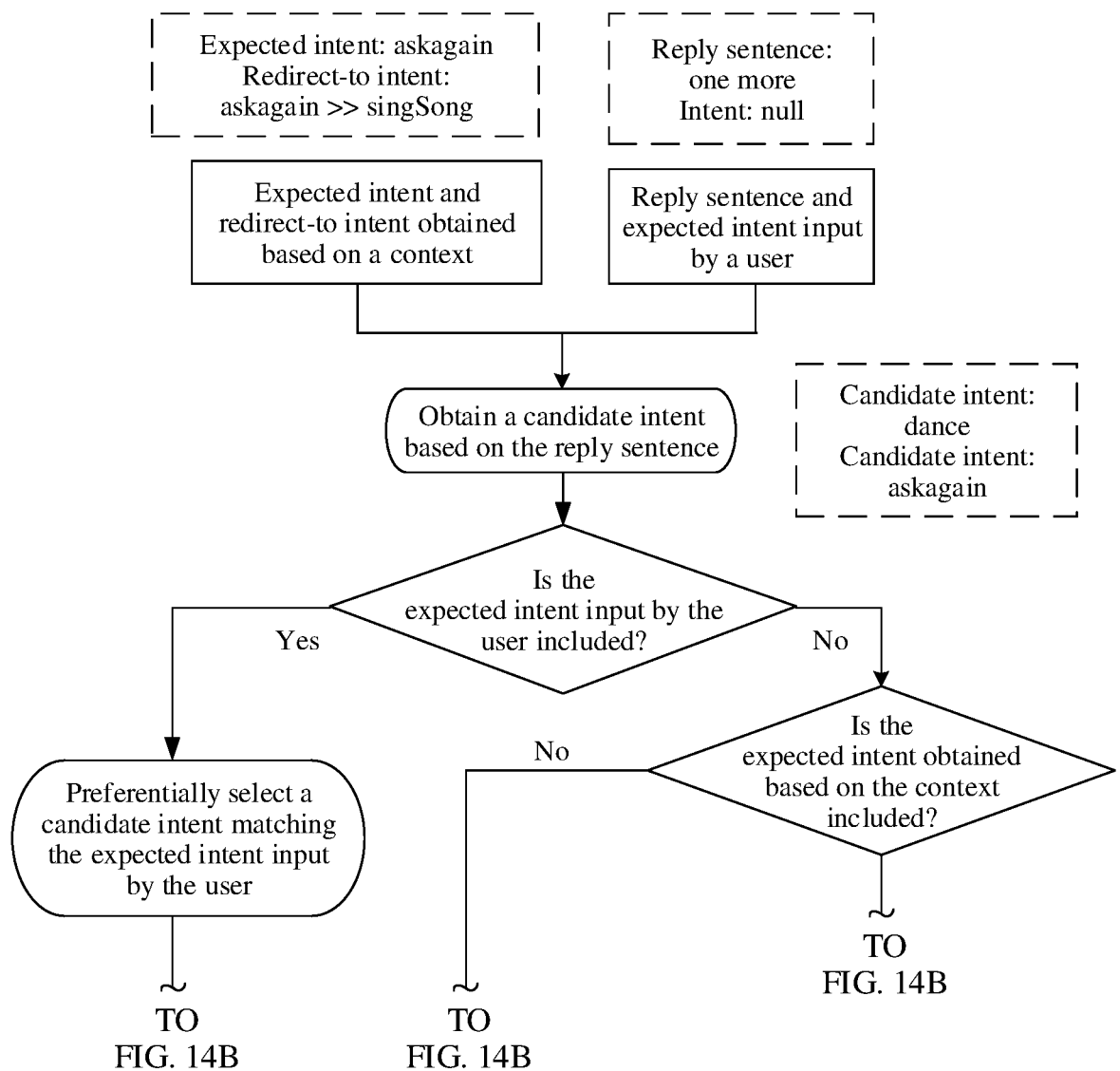
FIG. 14A and FIG. 14B are a example flowcharts of a response method in a human-computer dialogue according to an embodiment of this application.
Figure 14B:
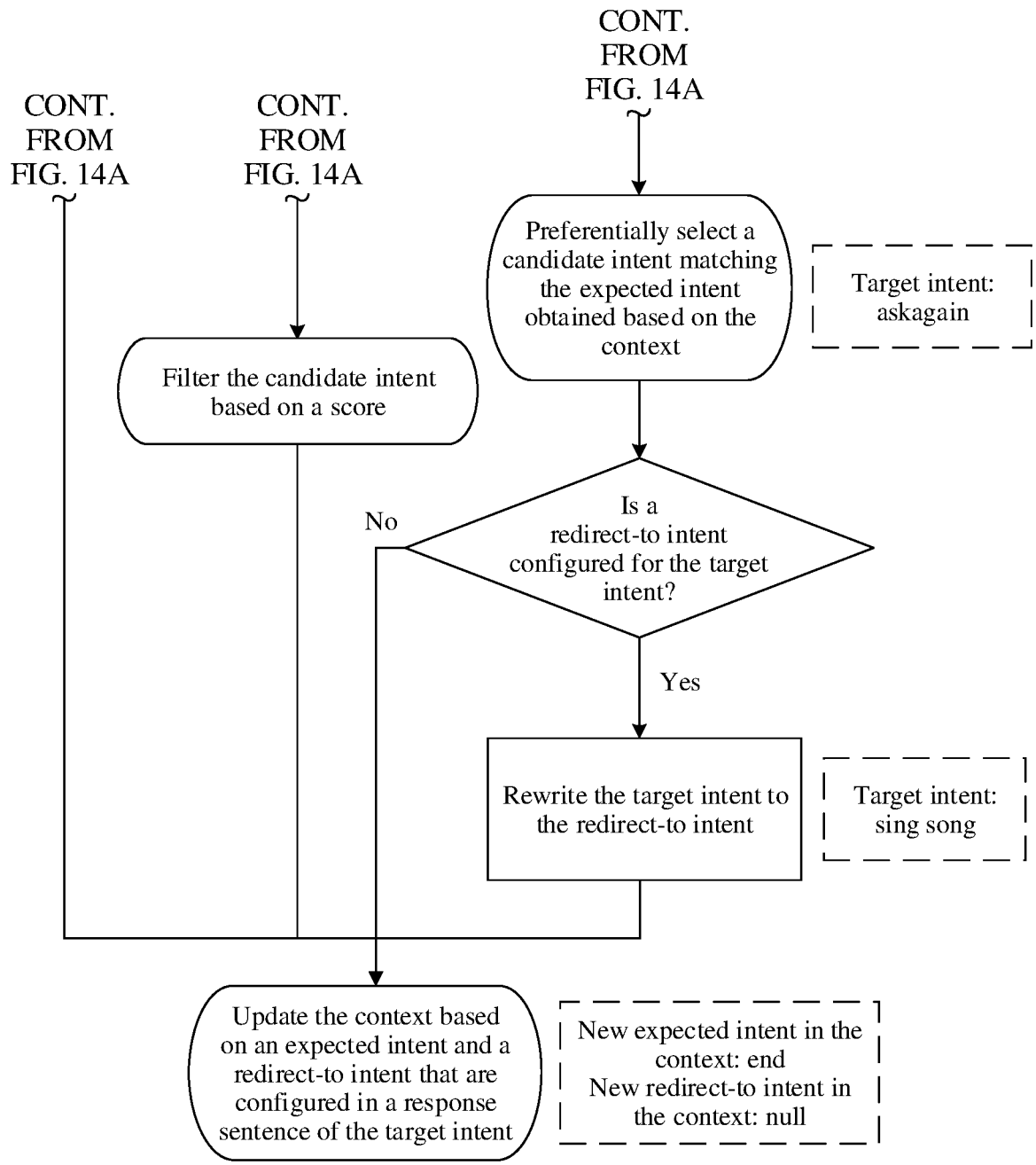

FIG. 12 is a flowchart of a response method 420 in a human-computer dialogue according to an embodiment of this application. For a process of the method 420, refer to flowcharts shown in FIG. 13, FIG. 14A and FIG. 14B, and FIG. 16A and FIG. 16B.

The method 420 may be specifically performed by the server 105 in the system architecture 100, and a reply sentence of a user for an interaction device in a dialogue in the method 420 may be input data provided by the client access device 104 in the system architecture 100. Optionally, the method 420 may be performed by a CPU, or may be performed jointly by a CPU and a GPU; or a GPU may not be used, but another processor suitable for neural network computing is used. This is not limited in this application.

For example, the method 420 includes S61 to S66.

S61: A dialogue system obtains a reply sentence of a user for an interaction device.

S62: The dialogue system performs intent recognition on the reply sentence to obtain a candidate user intent.

S63: The dialogue system obtains a historical response sentence, of the interaction device, that is in a historical dialogue and that is adjacent to the reply sentence.

S64: The dialogue system recognizes that information required for determining a target response sentence is missing in the candidate user intent.

S65: The dialogue system determines, from a plurality of expected user intents associated with the historical response sentence, a target expected user intent matching the candidate user intent, where the expected user intent is used to indicate content of an expected reply of the user to the historical response sentence.

The target expected user intent is an expected user intent, and the target expected user intent matches the candidate user intent. Optionally, the dialogue system determines, from the plurality of expected user intents associated with the historical response sentence, an expected user intent including the candidate user intent as the target expected user intent. For example, the historical response sentence is associated with two expected user intents: "Beijing+weather" and "Beijing+tourism information", and the candidate user intent is "weather". In this case, the target expected user intent is "Beijing+weather".

S66: The dialogue system determines a target response sentence of the interaction device for the reply sentence based on the target expected user intent.

In this manner, the dialogue system can determine a response sentence in a current dialogue.

Optionally, in a process of determining the target response sentence, the dialogue system obtains, based on a correspondence between the historical response sentence and at least one candidate response sentence template, the at least one candidate response sentence template corresponding to the historical response sentence, where the candidate response sentence template is used to indicate a sentence pattern of the target response sentence; obtains, from the at least one candidate response sentence template based on a correspondence between the target expected user intent and a target response sentence template, the target response sentence template matching the target expected user intent; and determines, based on the target response sentence template and the historical response sentence, the target response sentence of the interaction device for the reply sentence.

For example, the candidate response sentence template is a sentence template preconfigured by a developer.

The target response sentence is a response sentence of the interaction device in the current dialogue. For example, a candidate response sentence template for an expected user intent context_no in a previous dialogue is "That's fine.", and a candidate response sentence template for an expected user intent context_yes in the previous dialogue is "I will play the song for you.". If the candidate user intent in the current dialogue matches the expected user intent context_no, "That's fine." is used as the target response sentence template, and it is determined that the target response sentence is "That's fine.". Optionally, the dialogue system determines, based on the target user intent determined in the foregoing steps, a response sentence from at least one response sentence corresponding to the target user intent. Optionally, when the target user intent corresponds to a plurality of response sentences, the dialogue system randomly selects a response sentence from the plurality of response sentences corresponding to the target user intent, thereby making a returned response sentence random, avoiding excessive inflexibility of interaction in a human-computer dialogue, and creating more fun.

Optionally, if the expected user intent is a user intent indicating a negative reply or a user intent indicating dislike, the dialogue system may directly use a response sentence corresponding to the expected user intent as a final response sentence.

Optionally, the determining, based on the target response sentence template and the historical response sentence, the target response sentence of the interaction device for the reply sentence includes: obtaining a target keyword; recognizing a type of the target keyword; and filling the target keyword into a first target slot corresponding to the type in the target response sentence template, to obtain the target response sentence. The target keyword is used to indicate key session content of the historical dialogue. For example, the target keyword is a slot value in a slot in the historical response sentence. A first target slot is a slot in the target response sentence, and a type of the first target slot is the same as the type of the target keyword. For example, both the type of the target keyword and the type of the first target slot are a location, for example, both are Beijing. For another example, both the type of the target keyword and the type of the first target slot are weather. For example, after the target keyword is obtained, if the target keyword is "light rain", because "light rain" is weather, "light rain" is filled into a slot corresponding to X in "The weather today is X.", to obtain a target response sentence: "The weather today is light rain.".

With reference to the foregoing steps, after the dialogue system fills the target slot in the response sentence with the keyword associated with the expected user intent, the dialogue system determines a filled response sentence as a final response sentence, and uses the filled response sentence to reply to the reply sentence of the user for the interaction device in the current dialogue, to implement slot succession between the current dialogue and a next dialogue.

In this manner, the dialogue system can process a to-be-supplemented slot. Optionally, the dialogue system determines whether the target user intent has a slot that needs to be supplemented. If the target user intent has a slot that needs to be supplemented, the dialogue system queries a slot table to obtain a keyword of the to-be-supplemented slot, adds the found keyword to the keyword of the target user intent, and subsequently performs slot filling on a response sentence by using the found keyword to obtain a filled response sentence. For example, the slot filling is filling the first target slot in the response sentence of the interaction device for the reply sentence by using the keyword associated with the expected user intent. A slot name of the first target slot is the same as a slot name corresponding to a value. For example, both the slot name corresponding to the first target slot and the slot name corresponding to the value are a song. For another example, both the slot name corresponding to the first target slot and the slot name corresponding to the value are a location. The slot table is used to store a keyword associated with an expected user intent. Specifically, the dialogue system may predetermine a keyword associated with an expected user intent, and store the keyword to the slot table. For example, the dialogue system may extract a keyword from a response sentence in a previous dialogue.

Optionally, the obtaining a target keyword includes: extracting the target keyword from the historical response sentence; or extracting the target keyword from a historical reply sentence, in the historical dialogue, of the user for the interaction device; or querying configuration information to obtain the target keyword associated with the historical response sentence, where the configuration information includes a preset association relationship between the historical response sentence and the target keyword.

For example, a response sentence is "I am a music library. May I sing you the Twinkle, Twinkle, Little Star?". An expected user intent associated with the response sentence is a user intent context_yes. A slot associated with the user intent context_yes is song, and a keyword is "Twinkle, Twinkle, Little Star". A redirect-to user intent corresponding to the user intent context_yes is a user intent play_song. A response sentence for the user intent play_song is "I will play this song for you.".

For example, if the response sentence in the previous dialogue is "I am a music library. May I sing you the Twinkle, Twinkle, Little Star?", the dialogue system stores song: Twinkle, Twinkle, Little Star to the slot table when providing the response sentence in the previous dialogue. In the current dialogue, the reply sentence of the user for the interaction device is "okay", and the dialogue system first determines, based on the reply sentence, that the target user intent matched by the candidate user intent is context_yes, and then determines that the user intent context_yes has a redirect-to user intent play_song. In this case, an intent name of the target user intent is rewritten to play_song. The dialogue system queries the slot table and learns that the keyword associated with the expected user intent context_yes is "Twinkle, Twinkle, Little Star". In this case, the dialogue system performs slot filling on "I will play this song for you." by using song: Twinkle, Twinkle, Little Star, to obtain a filled response sentence: "I will play this song for you: Twinkle, Twinkle, Little Star.".

When the dialogue system asks about an opinion, recommends a resource, or initiates a new topic by using a response sentence, the response sentence usually includes a specific keyword, and the foregoing method provides a mechanism for passing a keyword in a response sentence to an expected user intent or a redirect-to user intent, to pass a keyword associated with a previous dialogue to a current dialogue, so that slot sharing can be implemented between the current dialogue and the previous dialogue across user intents. In particular, when a coreference or omission expression is used in a rely sentence of a user for an interaction device in the current dialogue, automatic slot complementation can be implemented by using the keyword associated with the previous dialogue, and a response sentence in the current dialogue inherits the keyword in the previous dialogue, thereby improving accuracy of a response sentence, and improving coherence of a plurality of rounds of dialogues.

How the dialogue system determines a to-be-added slot in a response sentence includes a plurality of manners. Optionally, a developer specifies a to-be-added slot when configuring a response sentence; or a service caller of the dialogue system may specify a to-be-added slot in a current dialogue when sending an NLU parsing request.

Optionally, the extracting the target keyword from the historical response sentence includes: performing named entity recognition on the historical response sentence, and using an obtained common named entity as the target keyword. Optionally, the extracting the target keyword from a historical reply sentence, in the historical dialogue, of the user for the interaction device includes: performing named entity recognition on the historical reply sentence, and using an obtained common named entity as the target keyword.

Optionally, the dialogue system returns the response sentence to the user.

Specifically, the dialogue system sends the intent name of the target user intent, the response sentence, and the keyword to a client of a dialogue robot, for example, the client access device 104, to return the response sentence to the user. For example, the dialogue system may send {query: okay, intent: play_song, slots: {song: Twinkle, Twinkle, Little Star}, reply: I will play this song for you.}.

Figure 15:
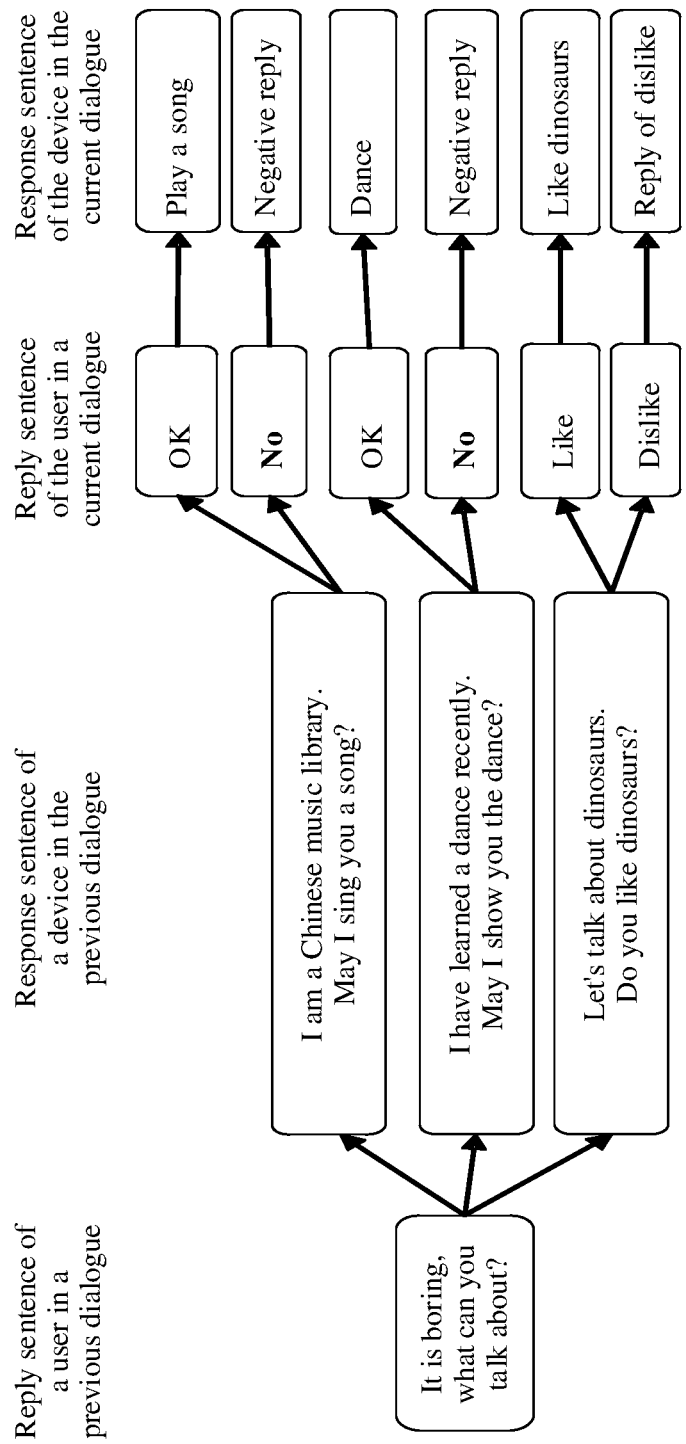
FIG. 15 is an example schematic diagram of a plurality of rounds of human-computer dialogues according to an embodiment of this application.
Figure 16A:
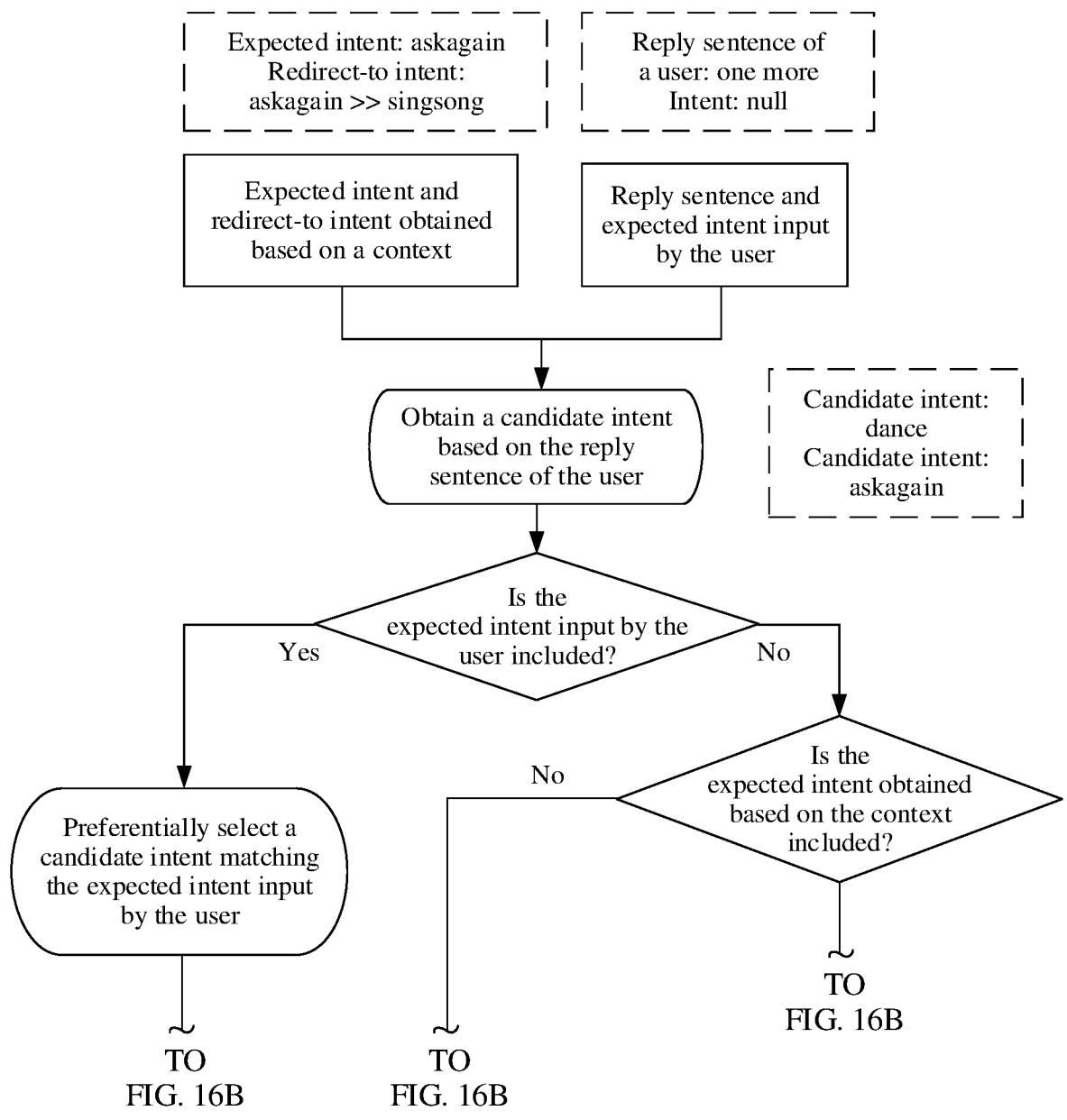
FIG. 16A and FIG. 16B are example schematic diagrams of a plurality of rounds of human-computer dialogues according to an embodiment of this application.
Figure 16B:
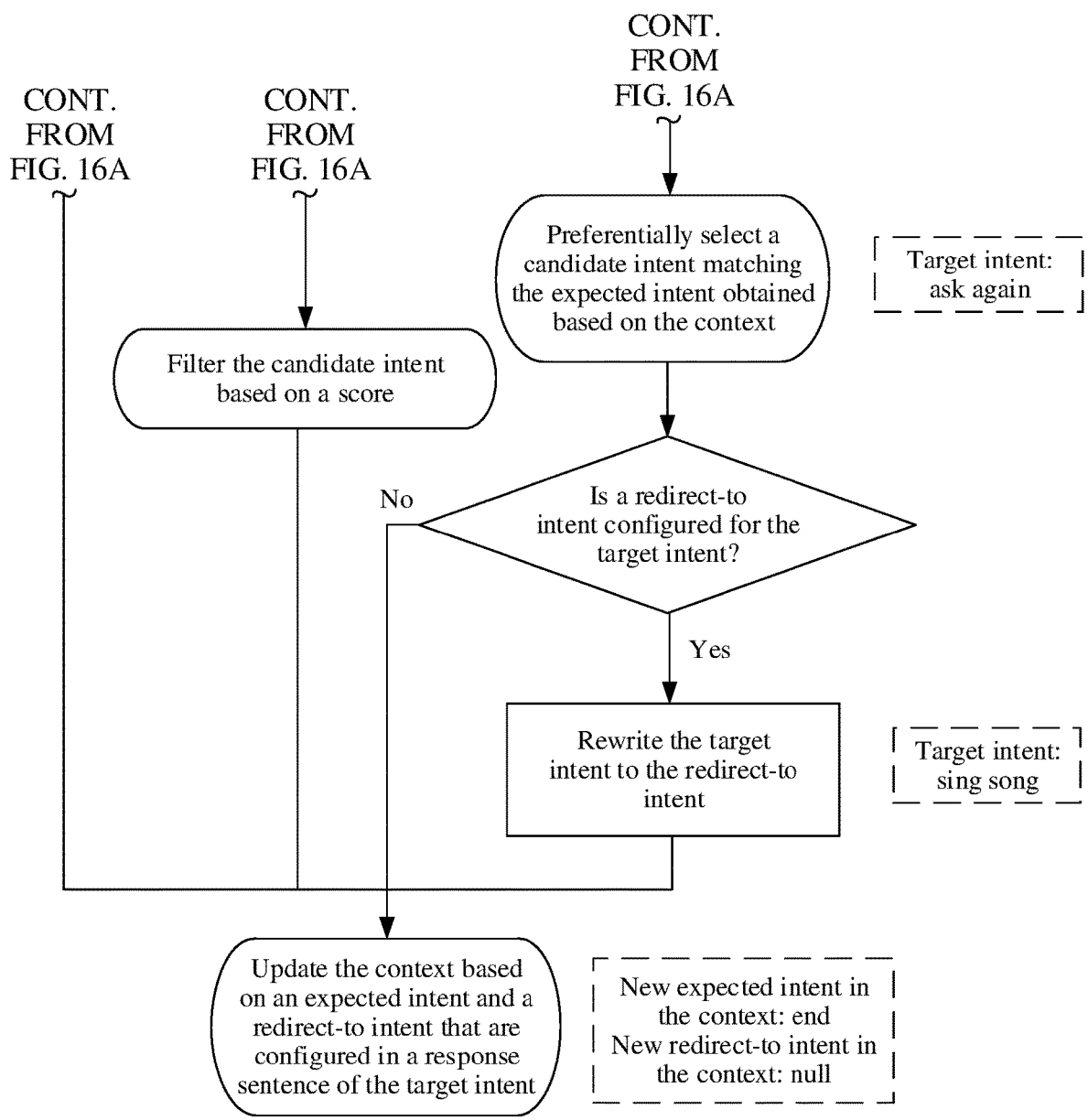

The method 410 shown in FIG. 13, FIG. 14A and FIG. 14B, and FIG. 15 helps implement context cohesion in a plurality of rounds of dialogues. For example, FIG. 15 shows sentences of a user and a dialogue system in two rounds of dialogues. It can be learned from sentence content shown in FIG. 15 that a response sentence provided by the dialogue system in a current dialogue is not only associated with a user intent expressed by a reply sentence of the user for an interaction device in the current dialogue, but also associated with a user intent in a previous dialogue. As shown in FIG. 16A and FIG. 16B, when a user inputs a reply sentence for an interaction device by using an incomplete expression, for example, inputs "okay" or "nope", a dialogue system can accurately understand a user intent by using logic of an expected user intent and a redirect-to user intent, and give a corresponding response sentence. For example, when the user inputs "okay", the dialogue system first matches an expected user intent context.yes based on "okay", and then finds a corresponding redirect-to user intent play_song based on the expected user intent context.yes, and returns "I will play the XX." based on the redirect-to user intent play_song. When the user inputs "nope", the dialogue system first matches an expected user intent context.no based on "nope". Because a redirect-to user intent corresponding to the expected user intent context.no is a user intent general_no and a response sentence corresponding to the user intent general_no is "That's fine.", the dialogue system returns "That's fine." based on the user intent general_no.

In the method provided in this embodiment, a response sentence initiated by the interaction device is associated with an expected user intent. When the user initiates a dialogue, in a process of selecting a user intent from candidate user intents of the current dialogue, a dialogue system preferentially selects a target expected user intent matching a historical response sentence, and the dialogue system determines a response sentence by using the target expected user intent. Because processing logic for an expected user intent is introduced and an expected user intent of a historical dialogue is passed to the current dialogue for use, the historical dialogue and the current dialogue are associated in terms of the user intent, thereby improving accuracy of a response sentence generated by the dialogue system, helping improve a context cohesion capability of the dialogue system, and improving coherence of a human-computer dialogue.

The foregoing describes the method 300, the method 400, and the method 410 in embodiments of this application. The following describes a dialogue system in embodiments of this application. It should be understood that the following dialogue system 500 and dialogue system 600 have any functions of the dialogue system in the method 300, the method 400, and the method 410.

Figure 17:
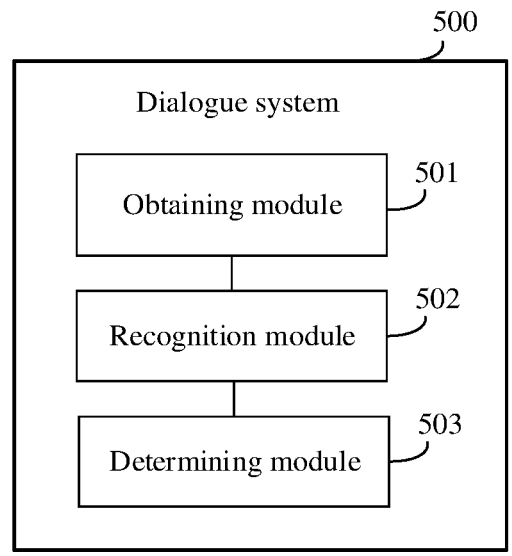
FIG. 17 is an example schematic diagram of a structure of a dialogue system 500 according to an embodiment of this application.

FIG. 17 is a schematic diagram of a structure of a dialogue system 500 according to an embodiment of this application. As shown in FIG. 17, the dialogue system 500 includes: an obtaining module 501, configured to perform S51, S54, S61, or S63; a recognition module 502, configured to perform S52 or S62; and a determining module 503, configured to perform S58, S65, or S66.

It should be understood that the dialogue system 500 corresponds to the dialogue system in the method 300, the method 400, and the method 410, and the modules in the dialogue system 500 and the foregoing other operations and/or functions are separately used to implement the steps and the methods implemented by the dialogue system in the method 300, the method 400, and the method 410. For specific details, refer to the method 300, the method 400, and the method 410.

It should be understood that, when the dialogue system 500 performs a human-computer dialogue, the division of the foregoing functional modules is merely used as an example for description. In actual application, the foregoing functions may be allocated to and performed by different functional modules as required. To be specific, an inner structure of the dialogue system 500 is divided into different functional modules to perform all or some of the foregoing functions. In addition, the dialogue system 500 provided in the foregoing embodiment and the method 300, the method 400, and the method 410 belong to a same concept. For a specific implementation process of the dialogue system 500, refer to the method 300, the method 400, and the method 410.

Corresponding to the method embodiments and the virtual apparatus embodiment provided in this application, an embodiment of this application further provides a dialogue system 600. The following describes a hardware structure of the dialogue system 600.

The dialogue system 600 corresponds to the dialogue system in the method 300, the method 400, and the method 410, and the modules in the dialogue system 600 and the foregoing other operations and/or functions are separately used to implement the steps and the methods implemented by the dialogue system in the method embodiments. For specific details about a detailed process of how the dialogue system 600 provides a human-computer dialogue service, refer to the method 300, the method 400, and the method 410. The steps of the method 300, the method 400, and the method 410 are performed by using an integrated logic circuit of hardware in a processor of the dialogue system 600 or instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The dialogue system 600 corresponds to the dialogue system 500 in the foregoing virtual apparatus embodiment, and each functional module in the dialogue system 500 is implemented by software of the dialogue system 600. In other words, the functional modules included in the dialogue system 500 are generated by the processor of the dialogue system 600 by reading program code stored in the memory.

Figure 18:
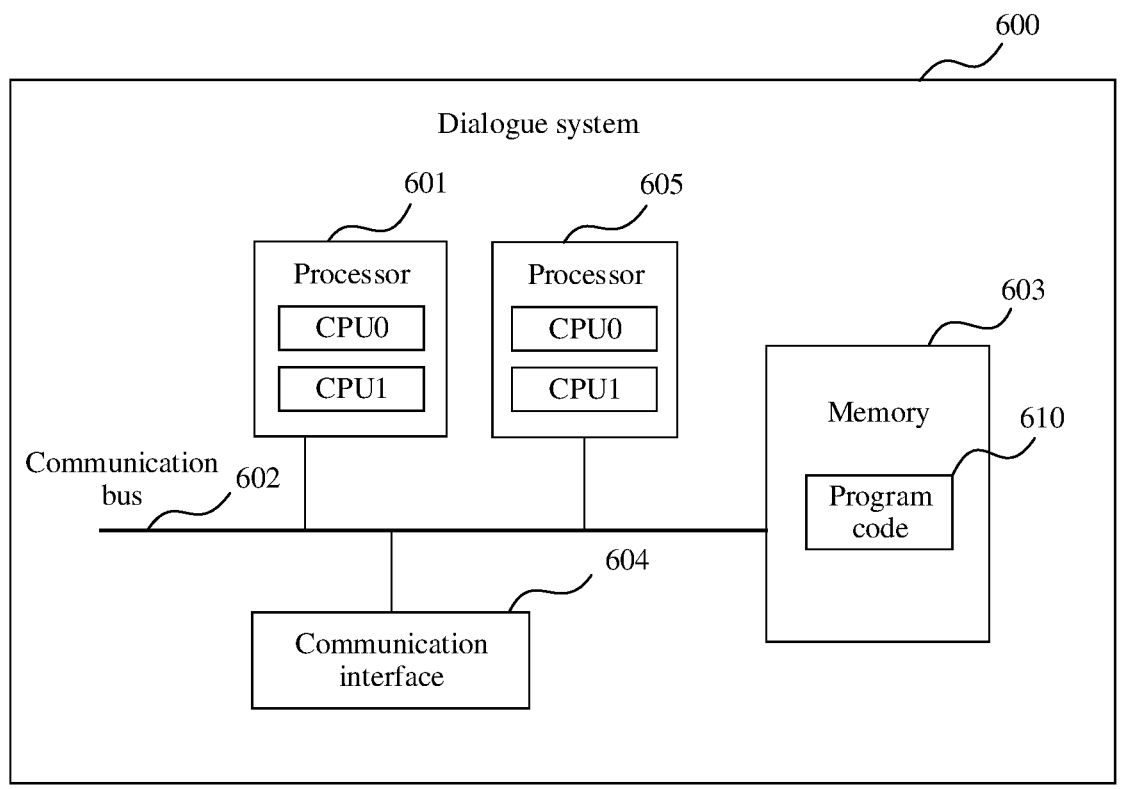
FIG. 18 is an example schematic diagram of a structure of a dialogue system 600 according to an embodiment of this application.

FIG. 18 is a schematic diagram of a structure of a dialogue system 600 according to an example embodiment of this application. The dialogue system 600 may be a host, a server, a personal computer, or the like. The dialogue system 600 may be implemented by a general bus system structure.

The dialogue system 600 includes at least one processor 601, a communication bus 602, a memory 603, and at least one communication interface 604.

The processor 601 may be a general-purpose central processing unit (CPU), a network processor (NP), or a microprocessor, or may be one or more integrated circuits configured to implement solutions of this application, for example, an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

The communication bus 602 is configured to transmit information between the foregoing components. The foregoing communication bus 602 may be classified into an address bus, a data bus, a control bus, and the like. For ease of representation, only one bold line is used for representation in FIG. 18, but this does not mean that there is only one bus or only one type of bus.

For example, the memory 603 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 603 is not limited thereto. The memory 603 may exist independently and is connected to the processor 601 by using the communication bus 602. Alternatively, the memory 603 may be integrated with the processor 601.

The communication interface 604 uses any apparatus like a transceiver, to communicate with another device or a communication network. The communication interface 604 includes a wired communication interface, and may further include a wireless communication interface. For example, the wired communication interface may be an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 601 may include one or more CPUs such as a CPU0 and a CPU1 in FIG. 18.

During specific implementation, in an embodiment, the dialogue system 600 may include a plurality of processors, for example, the processor 601 and a processor 605 shown in FIG. 18. Each of the processors may be a single-core processor (single-core CPU) or a multi-core processor (multi-core CPU). The processor herein may refer to one or more devices, circuits, and/or processing cores configured to process data (for example, computer program instructions).

During specific implementation, in an embodiment, the dialogue system 600 may further include an output device 606 and an input device 607 (not shown). The output device 606 communicates with the processor 601, and may display information in a plurality of manners. For example, the output device 606 may be a liquid crystal display (LCD), a light emitting diode (LED) display device, a cathode ray tube (CRT) display device, or a projector. The input device 607 communicates with the processor 601, and may receive a user input in a plurality of manners. For example, the input device 607 may be a mouse, a keyboard, a touchscreen device, or a sensor device.

In some embodiments, the memory 603 is configured to store program code 610 for performing solutions of this application, and the processor 601 may execute the program code 610 stored in the memory 603. In other words, the dialogue system 600 may implement the methods provided in the method 300, the method 400, and the method 410 by using the processor 601 and the program code 610 stored in the memory 603.

The dialogue system 600 in this embodiment of this application may correspond to the dialogue system in the method 300, the method 400, and the method 410. In addition, the processor 601, the communication interface 604, and the like in the dialogue system 600 may implement the functions and/or the steps and the methods implemented by the dialogue system in the method 300, the method 400, and the method 410.

It should be understood that the obtaining module 501 in the dialogue system 500 is equivalent to the communication interface 604 in the dialogue system 600, and the recognition module 502 and the determining module 503 in the dialogue system 500 may be equivalent to the processor 601 in the dialogue system 600.

It should be understood that the data input module 201 in the system architecture 200 is equivalent to the communication interface 604 in the dialogue system 600, and the model training module 202 and the result generation module 203 in the system architecture 200 may be equivalent to the processor 601 in the dialogue system 600.

In some possible embodiments, a computer program product is provided. When the computer program product is run in a dialogue system, the dialogue system is enabled to perform the methods provided in the method 300, the method 400, and the method 410.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It can be understood by a person skilled in the art that, for convenience and brevity of description, for detailed working processes of the foregoing systems, apparatuses, and units, reference may be made to corresponding processes in the method 300, the method 400, and the method 410.

In several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive), or the like.

A person of ordinary skill in the art may understand that all or a part of the steps of the embodiments may be implemented by hardware or a program instructing related hardware. The program may be stored in a computer-readable storage medium. The storage medium may include a read-only memory, a magnetic disk, or an optical disc.

In this application, the terms "first", "second", and the like are used to distinguish between same items or similar items that have a basically same usage and function. It should be understood that "first", "second", and "n$^{th}$" do not have a dependency relationship in logic or timing, and do not limit a quantity or an execution sequence either. It should be further understood that although the terms first, second, and the like are used to describe various elements in the following descriptions, these elements should not be limited by the terms. These terms are used only to distinguish one element from another element.

In this application, the term "at least one" means one or more. In this application, the term "a plurality of" means two or more. For example, a plurality of candidate user intents mean two or more candidate user intents. In this specification, the terms "system" and "network" are usually used interchangeably.

It should be further understood that the term "if" may be interpreted as "when" ("when" or "upon"), "in response to determining", or "in response to detecting". Similarly, according to the context, the phrase "if" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A response method in a human-computer dialogue, the response method implemented via an information processing system, and the response method comprising:
    obtaining a reply sentence of a user for an interaction device;
    performing intent recognition on the reply sentence to obtain a candidate user intent;
    obtaining a historical response sentence, of the interaction device, wherein the historical response sentence is included in a historical dialogue and is adjacent to the reply sentence;
    determining, from a plurality of expected user intents associated with the historical response sentence, a target expected user intent matching the candidate user intent, wherein the target expected user intent indicates a category of an expected reply of the user to the historical response sentence; and
    determining a target response, of the interaction device, to the reply sentence based on the target expected user intent and the historical response sentence.

2. The method according to claim 1, wherein the determining the target response of the interaction device to the reply sentence comprises:
    determining a redirect-to user intent based on the historical response sentence and the target expected user intent;
    determining, based on the redirect-to user intent, an instruction corresponding to the redirect-to user intent; and
    executing the instruction corresponding to the redirect-to user intent.

3. The method according to claim 1, wherein determining, from the plurality of expected user intents associated with the historical response sentence, the target expected user intent comprises:
    determining, from the plurality of expected user intents associated with the historical response sentence, a target expected user intent which is the same as the candidate user intent.

4. A response method in a human-computer dialogue, the method implemented via an information processing system, and the response method comprising:
    obtaining a reply sentence of a user for an interaction device;
    performing intent recognition on the reply sentence to obtain a candidate user intent;
    obtaining a historical response sentence, of the interaction device, wherein the historical response sentence is included in a historical dialogue and is adjacent to the reply sentence;
    determining, from a plurality of expected user intents associated with the historical response sentence, a target expected user intent matching the candidate user intent, wherein the target expected user intent indicates content of an expected reply of the user to the historical response sentence; and
    determining a target response sentence, of the interaction device, for the reply sentence based on the target expected user intent.

5. The method according to claim 4, wherein determining the target response sentence of the interaction device for the reply sentence comprises:
    obtaining, from at least one candidate response sentence template, based on a correspondence between the target expected user intent and the candidate response sentence template, a target response sentence template matching the target expected user intent; and
    determining, based on the target response sentence template and the historical response sentence, the target response sentence, of the interaction device, for the reply sentence.

6. The method according to claim 5, determining, based on the target response sentence template and the historical response sentence, the target response sentence, of the interaction device, for the reply sentence comprises:
  obtaining a target keyword indicating key session content of the historical dialogue;
  recognizing a type of the target keyword; and
  filling the target keyword to a first target slot corresponding to the type of the target keyword in the target response sentence template, to obtain the target response sentence.

7. The method according to claim 6, wherein the obtaining the target keyword comprises:
  extracting the target keyword from the historical response sentence;
  extracting the target keyword from a historical reply sentence, in the historical dialogue, of the user for the interaction device; or
  querying configuration information to obtain the target keyword associated with the historical response sentence, wherein the configuration information comprises an association relationship between the historical response sentence and the target keyword.

8. The method according to claim 7, wherein extracting the target keyword from the historical response sentence comprises:
  performing named entity recognition on the historical response sentence; and
  using an obtained common named entity as the target keyword.

9. The method according to claim 7, wherein extracting the target keyword from the historical reply sentence, in the historical dialogue, of the user for the interaction device comprises:
  performing named entity recognition on the historical reply sentence; and
  using an obtained common named entity as the target keyword.

10. The method according to claim 4, wherein after performing the intent recognition on the reply sentence to obtain the candidate user intent, the method further comprises:
  when the candidate user intent is missing, determining the target response sentence, of the interaction device, for the reply sentence based on the target expected user intent.

11. The method according to claim 4, wherein determining, from the plurality of expected user intents associated with the historical response sentence, the target expected user intent comprises:
  determining, from the plurality of expected user intents associated with the historical response sentence, an expected user intent comprising the candidate user intent as the target expected user intent.

12. A dialogue apparatus, comprising:
  a processor; and
  a memory configured to store computer readable instructions that, when executed by the processor, cause the processor to:
  obtain a reply sentence of a user for an interaction device;
  perform intent recognition on the reply sentence to obtain a candidate user intent;
  obtain a historical response sentence, of the interaction device, wherein the historical response sentence is included in a historical dialogue and is adjacent to the reply sentence; and
  determine, from a plurality of expected user intents associated with the historical response sentence, a target expected user intent matching the candidate user intent, wherein the target expected user intent indicates a category of an expected reply of the user to the historical response sentence; and
  determine a target response, of the interaction device, to the reply sentence based on the target expected user intent and the historical response sentence.

13. The dialogue apparatus of claim 12, wherein the processor is further caused to:
  determine a redirect-to user intent based on the historical response sentence and the target expected user intent;
  determine, based on the redirect-to user intent, an instruction corresponding to the redirect-to user intent; and
  execute the instruction corresponding to the redirect-to user intent.

14. The dialogue apparatus of claim 12, wherein the processor is further caused to:
  determine, from the plurality of expected user intents associated with the historical response sentence, an expected user intent the same as the candidate user intent as the target expected user intent.

* * * * *